(12) United States Patent
Barnes et al.

(10) Patent No.: US 10,755,406 B2
(45) Date of Patent: Aug. 25, 2020

(54) SYSTEMS AND METHODS FOR CO-EXPRESSION ANALYSIS IN IMMUNOSCORE COMPUTATION

(71) Applicant: Ventana Medical Systems, Inc., Tucson, AZ (US)

(72) Inventors: Michael Barnes, Oro Valley, AZ (US); Christophe Chefd'hotel, San Jose, CA (US); Ting Chen, Sunnyvale, CA (US); Shalini Singh, Tucson, AZ (US); Alisa Tubbs, Phoenix, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 280 days.

(21) Appl. No.: 15/640,412

(22) Filed: Jun. 30, 2017

(65) Prior Publication Data

US 2017/0309021 A1  Oct. 26, 2017

Related U.S. Application Data

(63) Continuation of application No. PCT/EP2015/083199, filed on Dec. 30, 2015.

(Continued)

(51) Int. Cl.
 *G06T 7/00* (2017.01)
 *G06F 19/00* (2018.01)

(52) U.S. Cl.
 CPC ............ *G06T 7/0012* (2013.01); *G06F 19/00* (2013.01); *G06T 7/00* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 2015/0253331 A1* | 9/2015 | Zijlstra | ............ | G01N 33/57407 |
| | | | | 435/7.92 |
| 2016/0266126 A1* | 9/2016 | Shipitsin | .............. | C12Q 1/6886 |
| 2017/0262984 A1* | 9/2017 | Barnes | ...................... | G06T 7/11 |

OTHER PUBLICATIONS

An ImageJ/Fiji Plugin for Segmenting and Quantifying Sub-Cellular Structure in Fluorescense Microscopy Images. Rizk et al. Jun. 2013.*

(Continued)

*Primary Examiner* — Delomia L Gilliard
(74) *Attorney, Agent, or Firm* — Ventana Medical Systems, Inc.

(57) ABSTRACT

Described herein are methods for co-expression analysis of multiple markers in a tissue sample comprising: computing a heat map of marker expression for each of a plurality of single marker channel images, wherein each of the plurality of single marker channel images comprise a single marker; identifying one or more candidate regions of interest in each heat map of marker expression; computing overlay masks comprising the identified one or more candidate regions of interest from each heat map of marker expression; determining one or more co-localized regions of interest from the overlay masks; mapping the one or more co-localized regions of interest to a same coordinate position in each of the plurality of single marker channel images; and estimating a number of cells in at least one of the determined one or more co-localized regions of interest in each of the plurality of single marker channel images.

37 Claims, 13 Drawing Sheets

Related U.S. Application Data

(60) Provisional application No. 62/253,179, filed on Nov. 10, 2015, provisional application No. 62/098,075, filed on Dec. 30, 2014.

(56) References Cited

OTHER PUBLICATIONS

Multi-Image Colocalization and Its Statistical Significance. Fletcher et al. Jul. 2010.*

Fletcher, P.A., et al., Multi-Image Co localization and Its Statistical Significance, Biophysical Journal, (2010), pp. 1996-2005, vol. 99.

International Preliminary Report on Patentability dated Jul. 4, 2017 in corresponding PCT/EP2015/081399 filed on Dec. 30, 2016, pp. 1-9.

International Search Report and Written Opinion dated May 3, 2016 in corresponding PCT/EP2015/081399 filed on Dec. 30, 2016, pp. 1-13.

Rizk, A., An ImageJ/Fiji plugin for segmenting and quantifying sub-cellular structures in fluorescence microscopy images, Seminar Inst. Res. Biomed., (2013), pp. 1-26.

* cited by examiner

SYSTEMS AND METHODS FOR CO-EXPRESSION ANALYSIS IN IMMUNOSCORE COMPUTATION

CROSS REFERENCE TO RELATED APPLICATIONS

This patent application is a continuation of International Patent Application No. PCT/EP2015/081399 filed Dec. 30, 2015, which claims priority to and the benefit of U.S. Provisional Application No. 62/098,075, filed Dec. 30, 2014 and U.S. Provisional Application No. 62/253,179, filed Nov. 10, 2015. Each of the above patent applications is incorporated herein by reference as if set forth in its entirety.

BACKGROUND

In the analysis of biological specimens, the specimens are often stained with one or more combinations of stains or assays, and the stained biological specimen is viewed or imaged for further analysis. Observing the assay enables a variety of processes, including diagnosis of disease, assessment of response to treatment, and development of new drugs to fight disease.

Multiplex staining is a technique for the detection of multiple biomarkers within a single tissue section and has become more popular due to its significant efficiencies and the rich diagnostic information it generates. Immunohistochemical (IHC) slide staining can be utilized to identify proteins, protein fragments, or nucleic acids in cells of a tissue section and hence is widely used in the study of different types of cells, such as cancerous cells and immune cells in biological tissue. In the context of staining for immune cells, the immunological data indicates the type, density, and location of the immune cells within tumor samples and this data is of particular interest to pathologists in determining a patient survival prediction. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors. In this context, multiple stains are used to target different types of immune cells, and the population distribution of each type of immune cell is used in studying the clinical outcome of the patients.

Typically, in immunoscore computations, a medical professional uses a multiplex assay that involves staining one piece of tissue or a simplex assay that involves staining adjacent serial tissue sections to detect or quantify markers, for example, multiple proteins or nucleic acids etc., in the same tissue block. With the stained slides available, the immunological data, for instance, the type, density and location of the immune cells, can be estimated from the tumor tissue samples.

In the traditional workflow for immunoscore computation, the expert reader selects the representative fields of view (FOVs) or regions of interest (ROIs) manually, as the initial step, by reviewing the slide under a microscope or reading an image of a slide, which has been scanned/digitized, on a display. When the tissue slide is scanned, the scanned image is viewed by independent readers and the FOVs or ROIs are manually marked based on the readers' personal preferences. After selecting the FOVs or ROIs, a pathologist/reader manually counts the immune cells within the selected FOVs or ROIs. Manual selection of the FOVs or ROIs and counting is highly subjective and biased to the readers, as different readers may select different FOVs or ROIs to count. Hence, an immunoscore study is not necessarily reproducible.

BRIEF SUMMARY OF THE INVENTION

In one aspect, the present disclosure is a computer-implemented method for co-expression analysis of multiple markers (or the stains associated with the markers) in a tissue sample comprising: computing a heat map of marker expression for each of a plurality of single marker channel images, wherein each of the plurality of single marker channel images comprise a single marker; identifying one or more candidate regions of interest (ROIs) in each heat map of marker expression; computing overlay masks comprising the identified one or more candidate ROIs from each heat map of marker expression; determining one or more co-localized ROIs from the overlay masks; and transferring the identified one or more co-localized ROIs to each of the plurality of single marker channel images. In some embodiments, the identifying of the one or more candidate ROIs comprises applying a threshold to each heat map of marker expression. In some embodiments, the identified one or more candidate ROIs have a value less than the applied threshold and correspond to regions of negative marker expression. In some embodiments, the identified one or more candidate ROIs have a value greater than the applied threshold and correspond to regions of positive marker expression. In some embodiments, the identifying of the one or more candidate ROIs comprises applying a local maximum filter to each heat map of marker expression and selecting a predetermined number of highest ranked local maxima. In some embodiments, the method further comprises the step of delineating a field of view having N×N pixels around each of the selected predetermined number of highest ranked local maxima, wherein the N×N pixel FOVs are selected as the identified one or more candidate ROIs.

In some embodiments, the determining of co-localized ROIs comprises identifying one or more at least partially overlapping candidate ROIs corresponding to different markers. In some embodiments, the one or more at least partially overlapping candidate ROIs are determined by morphologically and/or logically processing the overlay masks. In some embodiments, the method further comprises the step of evaluating whether an area of intersection of each of the one or more at least partially overlapping candidate ROIs meets an overlap threshold. In some embodiments, the evaluating of whether the area of intersection meets the overlap threshold comprises computing a ratio between the area of intersection and an area of union of the at least partially overlapping candidate ROIs and comparing the ratio to the overlap threshold.

In some embodiments, the computing of the heat maps of marker expression comprises applying a low pass filter to each of the plurality of single marker channel images. In some embodiments, the method further comprises the step of unmixing a multi-channel image of a tissue sample into each of the plurality of single marker channel images. In some embodiments, the plurality of single marker channel images are derived from a series of serial tissue sections, and where the method further comprises the step of registering each of the identified candidate ROIs to a common coordinate system or a common coordinate framework, where the common coordinate system can be the coordinate system of one of the single marker channel images, or it can be a coordinate system generally defined for the glass slides that typically hold tissue samples. In some embodiments, each of the plurality of single marker channel images are preprocessed such that non-tissue regions or other regions are masked. In some embodiments, less than all of the plurality of single marker channel images are used to identify co-localized ROIs. In some embodiments, the method further comprises the step of counting cells within at least one identified co-localized region of interest in each of the plurality of single marker channel images.

Another aspect of the present disclosure is a computer system for co-expression analysis of multiple markers in a tissue sample comprising one or more processors and at least one memory, the at least one memory storing non-transitory computer-readable instructions for execution by the one or more processors to cause the one or more processors to: compute a heat map of marker expression for each of a plurality of single marker channel images, wherein each of the plurality of single marker channel images comprise a single marker (corresponding to a single stain or signals from a single stain); identify one or more candidate regions of interest in each heat map of marker expression; compute overlay masks comprising the identified one or more candidate ROIs from each heat map of marker expression; determine one or more co-localized ROIs from the overlay masks; and transfer the identified one or more co-localized ROIs to each of the plurality of single marker channel images. In some embodiments, the one or more candidate ROIs are identified by applying a threshold to each heat map of marker expression. In some embodiments, the identified one or more candidate ROIs have a value less than the applied threshold and correspond to regions of negative marker expression. In some embodiments, the identified one or more candidate ROIs have a value greater than the applied threshold and correspond to regions of positive marker expression. In some embodiments, the one or more ROIs are identified by applying a local maximum filter to each heat map of marker expression and selecting a predetermined number of highest ranked local maxima. In some embodiments, a field of view (FOV) having N×N pixels is delineated around each of the selected predetermined number of highest ranked local maxima and wherein the N×N pixel FOVs are selected as the identified one or more candidate ROIs.

In some embodiments, the co-localized ROIs are determined by identifying one or more at least partially overlapping candidate ROIs that correspond to different markers. In some embodiments, the one or more at least partially overlapping candidate ROIs are determined by morphologically and/or logically processing the overlay mask. In some embodiments, the system executes instructions to evaluate whether an area of intersection of each of the one or more at least partially overlapping candidate ROIs meets an overlap threshold. In some embodiments, the evaluation of whether the area of intersection meets the overlap threshold comprises computing a ratio between the area of intersection and an area of union of the at least partially overlapping candidate ROIs and comparing the computed ratio to the overlap threshold.

In some embodiments, the heat maps of marker expression are computed by applying a low pass filter to each of the plurality of single marker channel images. In some embodiments, the plurality of single marker channel images are derived by unmixing a multi-channel image derived from a tissue sample. In some embodiments, the plurality of single marker channel images are derived from a series of serial tissue sections, and where each of the identified candidate ROIs are registered to a common coordinate system or a common coordinate framework. In some embodiments, the plurality of single marker channel images are preprocessed such that non-tissue regions or other regions are masked. In some embodiments, the identified co-localized ROIs correspond to less than all of the markers. In some embodiments, the computer system further executes instructions to count cells in at least one identified co-localized region of interest in each of the plurality of single marker channel images.

Another aspect of the present disclosure is a computer-implemented method for co-expression analysis of multiple markers in a tissue sample comprising: computing a heat map of marker expression for each of a plurality of single marker channel images, wherein each of the plurality of single marker channel images comprise a single marker; identifying one or more candidate regions of interest in each heat map of marker expression; computing overlay masks comprising the identified one or more candidate ROIs from each heat map of marker expression; determining one or more co-localized ROIs from the overlay masks; mapping the one or more co-localized ROIs to a same coordinate position in each of the plurality of single marker channel images; and estimating a number of cells in at least one of the determined one or more co-localized ROIs in each of the plurality of single marker channel images. In some embodiments, the identifying of one or more candidate ROIs comprises applying a threshold to each heat map of marker expression. In some embodiments, the identified one or more candidate ROIs have a value less than the applied threshold and correspond to regions of negative marker expression. In some embodiments, the identifying of one or more candidate ROIs comprises applying a local maximum filter to each heat map and selecting a predetermined number of highest ranked local maxima.

In some embodiments, the determining of one or more co-localized ROIs comprises morphologically and/or logically processing the identified one or more candidate ROIs in the overlay masks.

In some embodiments, the morphological and/or logical processing step identifies candidate ROIs corresponding to two or more different markers that at least partially overlap with each other. In some embodiments, the method further comprises the step of evaluating whether an area of intersection of the at least partially overlapping candidate ROIs meets an overlap threshold. In some embodiments, the evaluating of whether the area of intersection meets the overlap threshold comprises computing a ratio between the area of intersection and an area of union of the at least partially overlapping candidate ROIs and comparing the ratio to the overlap threshold. Thus, according to some embodiments, the area of intersection of two or more of the candidate ROIs is mapped to each of the single marker channel images, thereby identifying the co-localized ROIs in each of said images. In some embodiments, at least some of the identified one or more candidate ROIs are fields of view having a fixed N×N pixel size. In some embodiments, each of the plurality of single marker channel images are derived by unmixing a single image from a multiplexed tissue sample. In some embodiments, each of the plurality of single marker channel images are derived from a series of serial tissue sections, where each serial tissue section is stained with a single marker. In some embodiments, the method further comprises the step of registering each of the identified candidate ROIs to a common coordinate system. In some embodiments, the one or more co-localized ROIs comprise a constraint on a negatively expressed marker. In some embodiments, one or more co-localized ROIs co-express three or more markers. In some embodiments, the plurality of single marker channel images are preprocessed such that non-tissue regions are masked.

Another aspect of the present disclosure is a computer system for co-expression analysis of multiple markers in a tissue sample comprising one or more processors and at least one memory, the at least one memory storing non-transitory computer-readable instructions for execution by the one or more processors to cause the one or more processors to: compute a heat map of marker expression for each of a plurality of single marker channel images, wherein each of the plurality of single marker channel images comprise a single marker; identify one or more candidate regions of interest in each heat map of marker expression; compute overlay masks comprising the identified one or more candidate ROIs from each heat map of marker expression; determine one or more co-localized ROIs from the overlay masks; map the one or more co-localized ROIs to a same position in a common coordinate system in each of the plurality of single marker channel images; and estimate a number of cells in at least one of the determined one or more co-localized ROIs in each of the plurality of single marker channel images. In some embodiments, the one or more co-localized ROIs are determined by morphologically and/or logically processing the identified one or more candidate ROIs in the overlay mask. In some embodiments, the one or more candidate ROIs are identified by applying a threshold to each heat map. In some embodiments, the identified one or more candidate ROIs have a value less than the applied threshold and correspond to regions of negative marker expression. In some embodiments, the one or more candidate ROIs are identified by applying a local maximum filter to each heat map, and selecting a predetermined number of highest ranked local maxima. In some embodiments, the identified one or more candidate ROIs are registered to a common coordinate system.

Another aspect of the present disclosure is a computer system for co-expression analysis of multiple markers in a tissue sample comprising one or more processors and at least one memory, the at least one memory storing non-transitory computer-readable instructions for execution by the one or more processors to cause the one or more processors to (i) execute instructions in a heat map computation module to generate a heat map of marker expression for each of a plurality of single marker channel images; (ii) execute instructions in a region of interest identification module to identify candidate regions of interest in each of the heat maps of marker expression; and (iii) execute instructions in a co-localization module to determine co-localized regions of interest based on the identified candidate regions of interest. In some embodiments, instructions are provided to map positions of each of the determined co-localized regions of interest to each of the plurality of single marker channel images. In some embodiments, instructions are provided to count cells within at least one co-localized region of interest in each of the plurality of single marker channel images.

Another aspect of the present disclosure is a computer-implemented method for co-expression analysis of multiple markers in a tissue sample comprising: generating a tissue region masked image for each of a plurality of single marker channel images, each of the plurality of single marker channel images comprising a single marker; computing a heat map of marker expression for each tissue region masked image; identifying one or more candidate regions of interest (ROIs) in each heat map of marker expression; computing overlay masks comprising the identified one or more candidate ROIs from each heat map of marker expression; determining one or more co-localized ROIs from the overlay masks; mapping the one or more co-localized ROIs to each of the plurality of single marker channel images; and optionally counting a number of cells in each of the one or more co-localized ROIs in each of the plurality of single marker channel images.

In another aspect of the present disclosure the computer system for co-expression analysis of multiple markers in a tissue sample comprises one or more processors and at least one memory, the at least one memory storing non-transitory computer-readable instructions for execution by the one or more processors to cause the one or more processors to: generate a tissue region masked image for each of a plurality of single marker channel images, each of the plurality of single marker channel images comprising a single marker; compute a heat map of maker expression for each tissue region masked image; identify one or more candidate regions of interest in each heat map of marker expression; compute overlay masks comprising the identified one or more candidate ROIs from each heat map of marker expression; determine one or more co-localized ROIs from the overlay masks; map the one or more co-localized ROIs to each of the plurality of single marker channel images; and optionally count a number of cells in each of the one or more co-localized ROIs in each of the plurality of single marker channel images.

Yet another aspect of the present invention is a specimen analyzer comprising a computer system for co-expression analysis of multiple markers in a tissue sample comprising one or more processors and at least one memory, the at least one memory storing non-transitory computer-readable instructions for execution by the one or more processors to cause the one or more processors to: compute a heat map of marker expression for each of a plurality of single marker channel images, wherein each of the plurality of single marker channel images comprise a single marker; identify one or more candidate regions of interest in each heat map of marker expression; compute overlay masks comprising the identified one or more candidate ROIs from each heat map of marker expression; determine one or more co-localized ROIs from the overlay masks; transfer the identified one or more co-localized ROIs to each of the plurality of single marker channel images; and an image acquisition system.

Applicants have developed a process for identifying co-localized regions of interest for co-expression analysis of multiple markers where the developed process is superior to prior art subjective methods. Indeed, applicants have developed a process which advantageously provides reproducible, objective results and which are uninfluenced by human subjectivity. Applicants believe that the disclosed methods allow for a more accurate and efficient workflow for co-expression analysis and/or immunoscoring computation.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

DETAILED DESCRIPTION

Figure 1A:
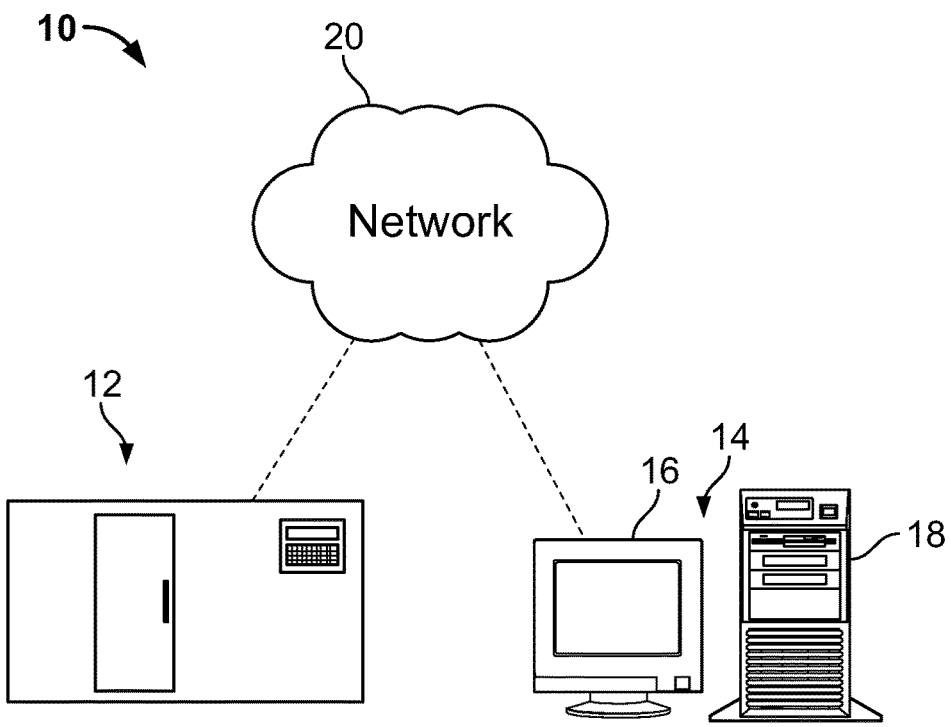
FIG. 1A illustrates a computer system for processing digital images of a tissue sample for co-expression analysis.

The present disclosure provides systems and methods for automatic identification of co-localized regions of interest (ROI) in multiplex assays. Detailed descriptions of one or more embodiments are provided herein. It is to be understood, however, that the systems and methods according to this disclosure may be embodied in various forms. Therefore, specific details disclosed herein are not to be interpreted as limiting, but rather as a representative basis for the claims and for teaching one skilled in the art to employ the present systems and methods in any appropriate manner.

The computer system and computer-implemented methods for co-expression analysis described herein are applicable to images of any type of image of a cell or image of a biological specimen (e.g. a tissue specimen from a biopsy procedure), and are useful to determine the type, density and location of any type of cell or group of cells.

The terms 'comprising,' 'including,' 'having,' and the like are used interchangeably and have the same meaning. Similarly, 'comprises,' 'includes,' 'has,' and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

The term 'marker' or 'biomarker' as used in the context of the present invention refers to nucleic acid as well as polypeptide molecules. Markers thus comprises e.g. RNA (mRNA, hnRNA, etc.), DNA (cDNA, genomic DNA, etc.), proteins, polypeptides, proteoglycans, glycoproteins and the respective fragments of these molecules. A marker is a measurable indicator of some biological state or condition. According to embodiments, one or more of the used markers are biomarkers which are indicative of a particular type of immune cell, e.g. a B-lymphocyte, a T-lymphocyte, a macrophage, or a particular sub-population of B-lymphocytes, T-lymphocytes, macrophages, or other cells of the immune system.

A 'multi-channel image' as understood herein encompasses a digital image obtained from a biological tissue sample in which different biological structures, such as nuclei and tissue structures, are simultaneously stained with specific fluorescent dyes, quantum dots, chromogens, etc., each of which attenuates light, fluoresces or is otherwise detectable in a different spectral band thus constituting one of the channels of the multi-channel image.

A 'tissue sample' as understood herein is any biological sample that is obtained from a human or animal body for anatomic pathology. For example, a tissue sample may be derived from breast tissue, lung tissue, prostate tissue, etc. and may comprise samples derived from tumors, suspected tumors, or from healthy tissue. Other examples of tissue samples and specimens are their preparation are disclosed herein.

An 'unmixed image' as understood herein encompasses a grey-value or scalar image obtained for one channel of a multi-channel image. By unmixing a multi-channel image one unmixed image per channel is obtained. Typically, such an unmixed image channel represents the local presence and intensity of one biomarker and, therefore, a local biological state or condition.

A "mask" or "image mask" as used herein is a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

A "field of view" (FOV) according to embodiments of the invention is a set of adjacent pixels in a digital image. A FOV may, for example, be selectively used for some image analysis tasks such as masking, filtering and/or object detection. According to embodiments, each FOV in an image has N×N pixels and is delineated around each of a selected predetermined number of highest ranked local maxima of a marker-specific image or heat-map thereof.

A candidate "region of interest" or candidate "ROI" according to embodiments of the invention is a set of adjacent pixels of a digital image or a heat map thereof that are, for example, used as input for identifying one or more intersecting image areas. A FOV is typically a coherent image region that is viewed, acquired, or displayed. It is therefore often, but not necessarily round or rectangular. A region of interest is typically a coherent region of tissue (that corresponds to a respective region of a digital image) defined by a biological state or condition, an example being a tumor region with a strong immune response. According to some embodiments, N×N pixel FOVs are selected as the identified one or more candidate ROIs.

An image area of a digital image or heat map corresponding to said intersection area is also referred to as "ROI" or "co-localized region" or "co-localized ROI".

A "coordinate system" as used herein is a system which uses one or more numbers, or coordinates, to uniquely determine the position of a point or other geometric element, e.g. a pixel, on Euclidean space. According to embodiments, a common coordinate system of multiple images is generated by an image registration process. Thereby, the pixels of two or more images or heat maps are aligned to the coordinates of the common coordinate system. The alignment may be performed such that e.g. pixels having been derived from a particular reference element of a tissue sample are mapped to each other and overlay each other.

A "heat map" as used herein is a graphical representation of data, e.g. a digital image, where the individual pixel values are represented as colors. A "heat map of marker expression" is, for example, a heat map where the degree of marker expression and the corresponding density of the marker-specific stain is color-encoded.

An "immune score" as used herein is a score value that can be used as a prognostic factor e.g. for tumor progression. An immune score may be indicative of various features of an organism's immune response to a tumor. For example, an immune score may depend on the number, type and/or location of immune cells of a particular type within or at the periphery of a tumor or tumor cell cluster.

A computer-based device for co-expression analyses is shown in FIG. 1. The skilled artisan will appreciate that other computer devices or systems may be utilized and that the computer systems described herein may be communicatively coupled to additional components, e.g. analyzers, scanners or imaging systems, automated slide preparation equipment, etc. Some of these additional components and the various computers that may be utilized are described further herein.

In general, the imaging apparatus 12 can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. Imaging systems are described further herein.

The computer device system 14 can include a desktop computer, a laptop computer, a tablet, or the like, digital electronic circuitry, firmware, hardware, memory, a computer storage medium, a computer program, a processor (including a programmed processor), and/or the like. The illustrated computing system 14 of FIG. 1 is a computer with a screen or display device 16 and a tower 18. The tower 18 can store digital images in binary form. The images can also be divided into a matrix of pixels. The pixels can include a digital value of one or more bits, defined by the bit depth. The network 20 or a direct connection interconnects the imaging apparatus 12 and the computer system 14. The network 20 may include, without limitation, one or more gateways, routers, bridges, combinations thereof, or the like. The network 20 may include one or more servers and one or more websites that are accessible to users and can be used to send and receive information that the computer system 14 can utilize. A server may include, without limitation, one or more associated databases for storing information (e.g., digital images, algorithms, staining protocols, cutoff values for comparative evaluations, or the like). The network 20 can include, but is not limited to, data networks using the Transmission Control Protocol (TCP), User Datagram Protocol (UDP), Internet Protocol (IP) and other data protocols. In some embodiments, the computer device or system further comprises a display output or other means of providing data/output to a user, operator, or downstream instrument or process.

Figure 1B:
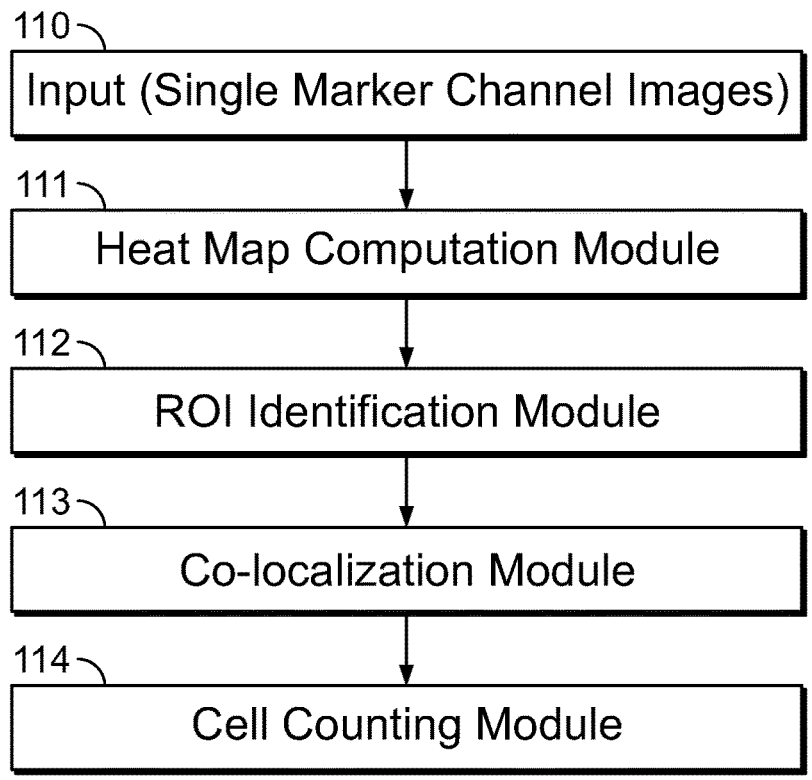
FIG. 1B provides a flowchart outlining modules used in the processing of digital images for co-expression analysis.

With reference to FIG. 1B, the computer device or system 114 (or computer-implemented method) comprises one or more processors and at least one memory, the at least one memory storing non-transitory computer-readable instructions for execution by the one or more processors to cause the one or more processors to execute instructions to receive input images 110, run a tissue run a heat map computation module 111 (to generate heat maps of marker expression), run a ROI identification module 112 (to identify one or more candidate ROIs), run a co-localization module 113 (to identify one or more co-localized ROIs), and run a cell counting module 114 (to return an estimate of cells expressing each marker in at least one co-localized ROI in at least some of the plurality of single marker channel images). Each of these modules is described in greater detail herein. Additional modules, e.g. an unmixing module, a tissue region masking module, and an image registration module, may be incorporated in the workflow in some embodiments. The skilled artisan will recognize that any of the instructions, algorithms, and filters described for use within each module may be adapted or changed based on the markers being detected.

Figure 2A:
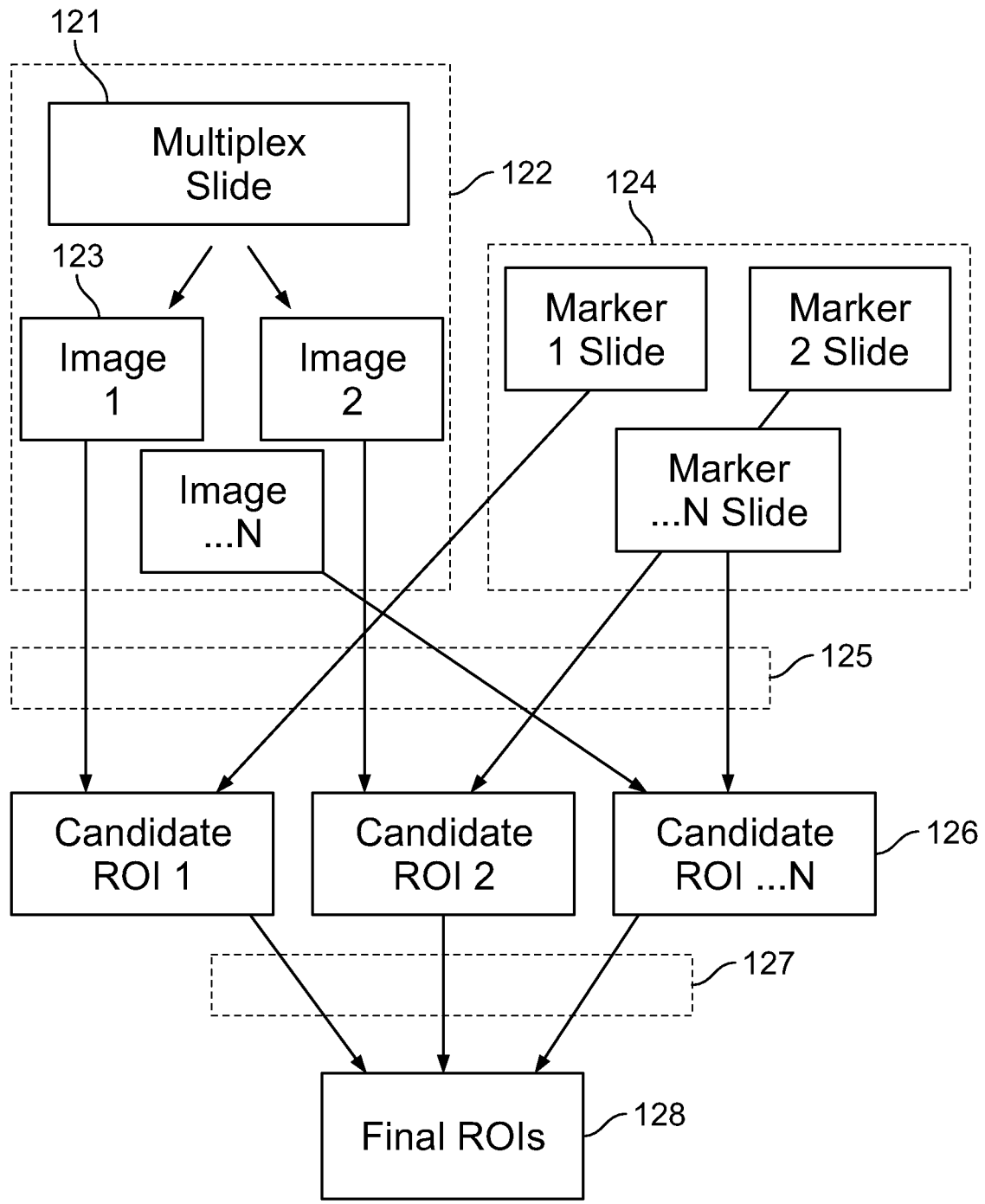
FIG. 2A illustrates one embodiment of identifying co-localized regions of interest.

FIG. 2A provides an overview of a method for co-expression analysis. In FIG. 2A, the variable "N" represents the number of markers applied to a tissue sample. For a multiplex slide 121, unmixing 122 is performed, such as by the methods described herein, to obtain an image 123 for each marker (i.e. a plurality of single marker channel images). Otherwise, a plurality of single marker channel images 124 (derived from serial tissue sections) are utilized as an input. In either case, a heat map of marker expression is generated for each of the plurality of single marker channel images and one or more candidate ROIs for each marker may be identified by evaluating the heat maps of marker expression. A co-localization module 127 is then used to determine those co-localized ROIs 128 co-expressing the various selected markers, where the co-localized ROIs 128 may be transferred back (e.g. mapped back) to the plurality of single marker channel images, as described herein, for further downstream processing (e.g. cell counting) by a computer system or by a trained medical professional.

Figure 2B:
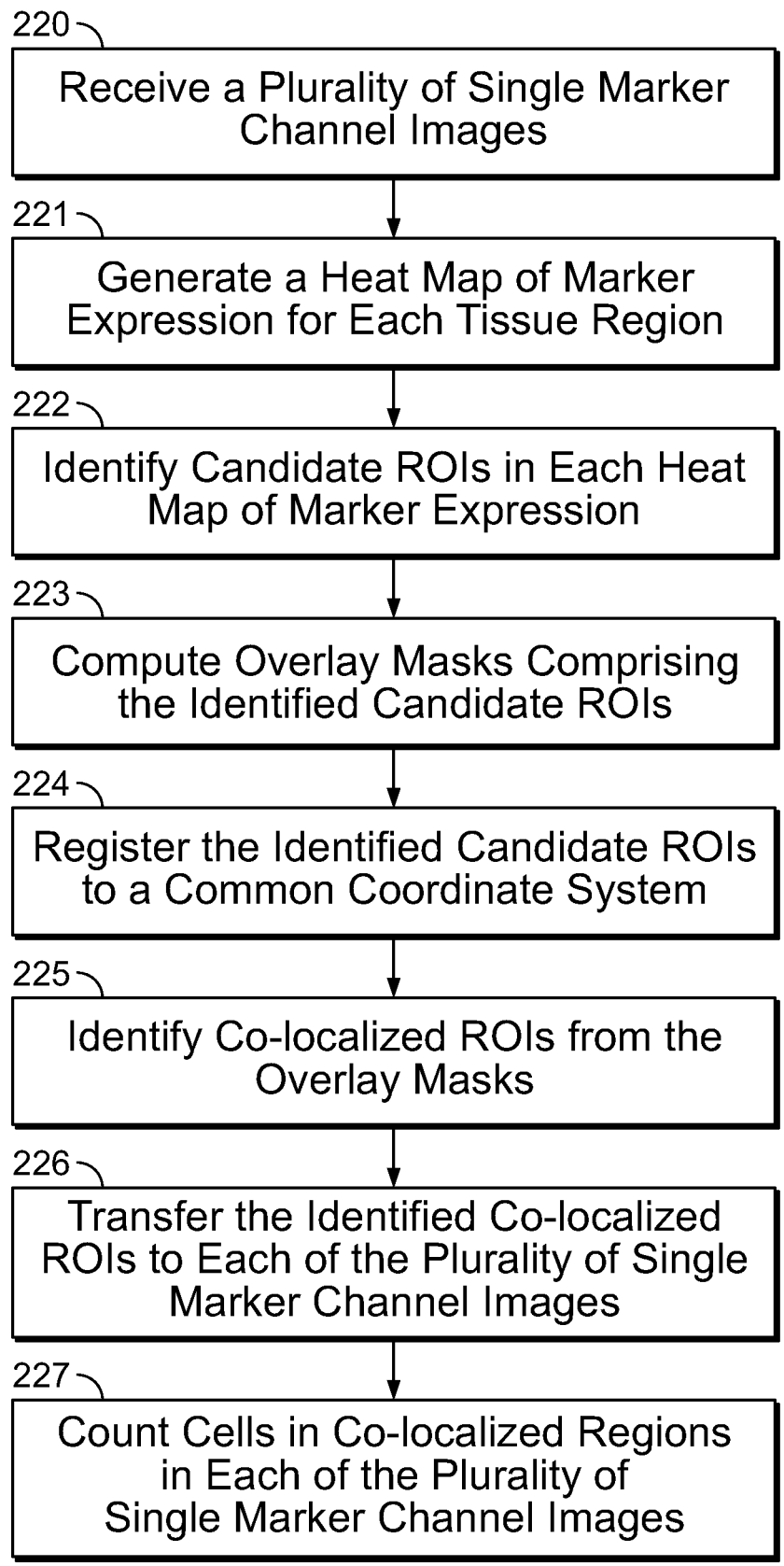
FIG. 2B provides a flowchart outlining the steps in one method of the present disclosure for identifying co-localized regions of interest and, in some embodiments, counting cells in those identified co-localized regions of interest.

FIG. 2B provides a flowchart outlining the steps for determining co-localized regions of interest in a plurality of single marker channel images. In some embodiments, the method starts with the step of reading each of a plurality of single marker channel images (step 220) from an unmixed multiplex slide (a "multiplex slide") or from singularly stained slides derived from serial tissue sections ("simplex slides"). In some embodiments, a tissue region masking module may be used to mask portions of the plurality of single marker channel images (such as portions corresponding to non-tissue regions). Thus, by generating an image mask and applying the mask on one or more of the single marker images, regions which are not of interest or are suspected to comprise low quality data, e.g. due to staining artifacts or noise, can be masked out and excluded from further processing steps. A heat map of marker expression may then be generated (step 221) corresponding to each of the plurality of single marker channel images by applying a low pass filter on each of the plurality of single marker channel images (or on parts thereof which have not been masked).

A low pass filter, for example, a filter that smoothes the single marker channel image, thereby replacing each pixel value with a pixel value that averages or otherwise represents the pixel values in a local neighborhood around each pixel. A low pass filter can be used to determine one or more global extrema of biomarker presence in a heat map. Similarly, a band pass filter can be used to determine one or more local extrema of biomarker presence in a heat map, with a local minimum or maximum identifying regions that have a higher or lower biomarker presence than regions in their vicinity, respectively.

Candidate ROIs may subsequently be identified (step 222) by applying (i) a threshold to the heat maps of marker expression, or (ii) a local maximum filter to the heat maps of marker expression and selecting a predetermined number of highest ranked local maxima. For example, the intensities of the pixels in each heat map (having been derived from a respective marker image) may correlate with and indicate the strength of marker expression at a respective point in the tissue sample. The application of the threshold may comprise, for example, comparing the intensity values of each pixel in each heat map of a respective marker image with a pixel intensity threshold. The pixel intensity threshold may be marker-specific and/or assay specific. The threshold may be determined e.g. empirically by analyzing the expression level and corresponding staining and pixel intensity of samples comprising immune cells of a specific, known type.

In embodiments where the plurality of single marker channel images are derived from a series of serial tissue sections, the identified candidate ROIs are registered to a common coordinate system (step 224) prior to or after generation of the overlay masks (step 223). Following identification of the candidate ROIs, overlay masks are computed for each heat map of marker expression (step 223), where each overlay mask corresponds to one of the heat maps of marker expression and comprises the identified one or more candidate ROIs from that heat map of marker expression. The overlay masks are superimposed over each other and one or more co-localized ROIs are identified (step 225). The co-localized ROIs can be determined e.g. as the intersection area of each of the candidate ROIs, the intersection areas being mapped back to each of the overlay masks or respective marker specific heat maps. The positions of the computed co-localized regions of interest are then transferred back to each of the plurality of single marker channel images (step 226). In some embodiments, cells expressing each of the markers are then counted or estimated (step 227) in at least some of the co-localized ROIs in at least some of the single marker channel images Each of the modules and steps identified in FIGS. 2A and 2B are described in more detail herein.

Input Images

As an initial step, the computer system receives a plurality of single marker channel images as input (step 220), where each of the plurality of single marker channels images provided comprise signals corresponding to a single marker (e.g. signals from a stain or a tag, including chromogens, fluorophores, quantum dots, etc.). In some embodiments, the plurality of single marker channel images are pre-processed such that non-tissue regions are masked, i.e. only tissue regions are shown. The plurality of single marker channels received as input (step 220) are provided to a heat map computation module 111 such that heat maps of marker expression (step 221) may be generated for each of the plurality of single marker channel images.

The plurality of single marker channel images may be derived from several sources, including (i) a multi-channel image of a tissue sample from a multiplex assay, where the tissue sample is stained with two or more markers ("multiplex image"), (ii) a series of images taken from serial tissue sections, where each of the images in the series of images are stained with a single marker ("simplex images"); or (iii) a combination of multiplex and simplex images. Unlike simplex images, multiplex images must be unmixed into the plurality of single marker channel images. In some embodiments, however, each of the simplex images may also unmixed so as to separate signals corresponding to the marker in each image from signals corresponding to a counterstain.

Methods of unmixing are well known to those of ordinary skill in the art and any method now known or later discovered may be used to "unmix" the multiplex images into the plurality of single marker channel images. In general, the unmixing process extracts stain-specific channels to determine local concentrations of individual stains using reference spectra that are well known for standard types of tissue and stain combinations. The pixel intensities of the respective single marker channel images correlate with the amount of stain specifically bound to said marker at corresponding locations in the tissue sample. The amount of bound stain, again, correlates with the amount of said marker and thus, with the expression level of said marker, at said tissue section location. The terms "unmixing" and "color deconvolution" (or "deconvolution") or the like (e.g. "deconvolving," "unmixed") are used interchangeably.

In some embodiments, the multiplex images are unmixed using linear unmixing. Linear unmixing is described, for example, in 'Zimmermann "Spectral Imaging and Linear Unmixing in Light Microscopy" Adv Biochem Engin/Biotechnol (2005) 95:245-265,' the disclosure of which is incorporated herein by reference in its entirety. In linear unmixing, a pixel is categorized as being linearly mixed when the measured spectrum $(S(\lambda))$ equals the proportion or weight $(A)$ of each individual fluorophore or brightfield chromogen reference spectrum $(R(\lambda))$:

$$S(\lambda)=A1 \cdot R1(\lambda)+A2 \cdot R2(\lambda)+A3 \cdot R3(\lambda) \ldots Ai \cdot Ri(\lambda)$$

which can be more generally expressed as:

$$S(\lambda)=\Sigma Ai \cdot Ri(\lambda) \text{ or } S=A \cdot R$$

In these equations, the signal in each pixel (S) is measured during acquisition of the multiplex image and the reference spectra for the known stains are usually determined independently in specimens labeled with only a single single using identical instrument settings. It becomes a simple linear algebra matrix exercise to determine the contributions of various stains (Ai) by calculating their contribution to each point in the measured spectrum. In some embodiments, the solution is obtained using an inverse least squares fitting approach that minimizes the square difference between the measured and calculated spectra by applying the following set of differential equations:

$$[\partial \Sigma j \{S(\lambda j) - \Sigma i\ Ai \cdot Ri(\lambda j)\} 2]/\partial Ai = 0$$

In this equation, j represents the number of detection channels and i equals the number of stains. The linear equation solution often involves allowing a constrained unmixing to force the weights (A) to sum to unity with thresholding of the data to classify pixels.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference vectors are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended/not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

In some embodiments, the plurality of single marker channel images are masked such that only tissue regions are present in the images. To generate these masked images, the multiplex image, the unmixed multiplex images, or the series of simplex images (any of which may be of a whole slide or a portion thereof) are provided to a tissue region masking module. In some embodiments, a tissue region mask is generated to mask non-tissue regions from tissue regions. The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region.

For example, a tumor region can be defined from a slide stained with Hematoxylin and Eosin (H&E) or from a slide stained with an IHC marker to identify tumor cells, and the tumor can be transferred to other marker slides via image registration (see below). A periphery of the tumor region can be defined by dilating the tumor area by x millimeters within the tissue region. The co-localization analysis of the multiple markers can thus be performed within the tumor region, the periphery of the tumor, or in the rest of the tissue samples.

According to some embodiments, the tissue masking is performed after the generation of the heat maps of marker expression. According to some embodiments, the tissue masking is performed (i.e., the mask is applied) at an early stage, e.g. before the heat maps are generated, on the respective channel image. This may have the advantage that less tissue needs to be analyzed and, therefore, analysis results are available in shorter time.

In some embodiments, a segmentation technique is used to generate the tissue region masked images by masking tissue regions from non-tissue regions in the plurality of single marker channel images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2).

Figure 3:
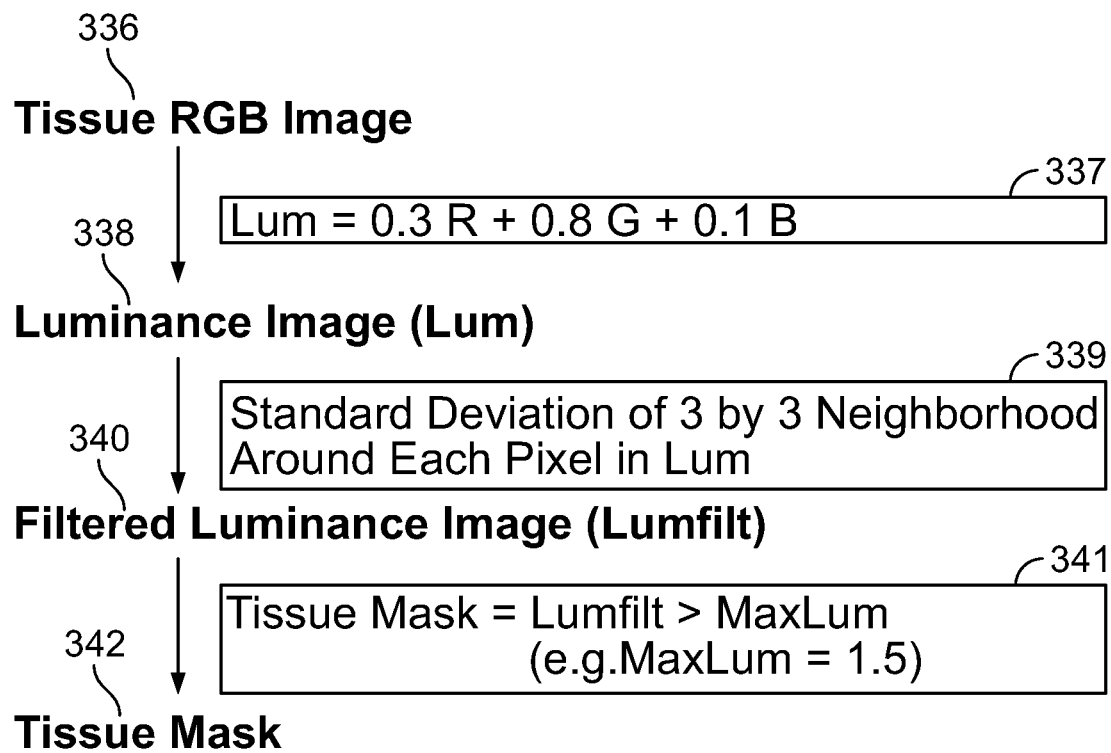
FIG. 3 sets forth the steps of generating a tissue region mask.
Figure 4:
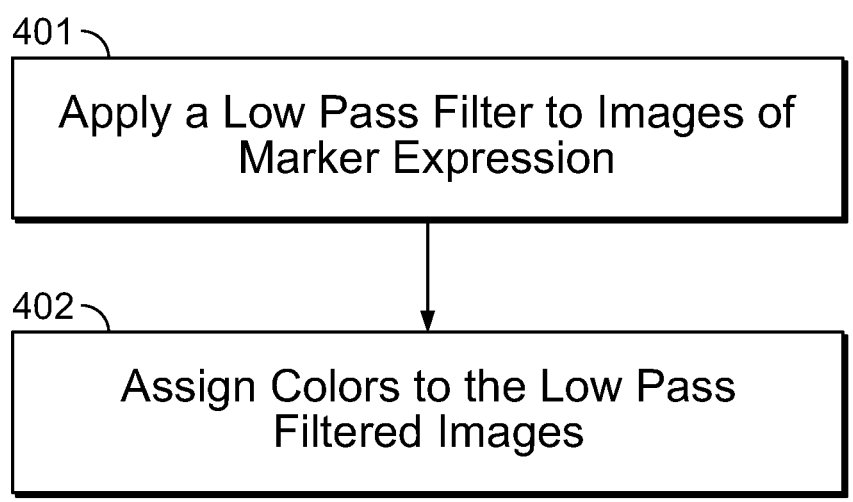
FIG. 4 provides a flowchart outlining the steps for the generation of heat maps of marker expression.

With reference to FIG. 3, in some embodiments, the generation of the tissue region masked image comprises one or more of the following non-limiting operations: computing the luminance (337) of a low resolution input single marker channel image (336), producing a luminance image (338) from the single marker channel image, applying a standard deviation filter to the produced luminance image (339), computing a filtered luminance image (340) from the produced luminance image, and applying a threshold to filtered luminance image (341), such that pixels with a luminance above a given threshold are set to one, and pixels below the threshold are set to zero, producing the tissue region mask (342). Additional information and examples relating to the generation of tissue region masks are disclosed in PCT/EP/2015/062015 (WO/2015/181371), entitled "An Image Processing Method and System for Analyzing A Multi-Channel Image Obtained From a Biological Tissue Sample Being Stained By Multiple Stains," the disclosure of which is hereby incorporated by reference herein in its entirety.

Heat Map of Marker Expression Generation Module

After the plurality of single marker channel images are received as input (step 220), a heat map generation module 111 is used to generate a heat map of marker expression for each of the plurality of single marker channel images (step 221). It is from the generated heat maps of marker expression that one or more candidate regions of interest may be identified for each marker (step 222), such as by finding "hotspots" in the heat maps of marker expression, i.e. regions of high marker density or concentration.

In general, a heat map of marker expression delineates the density or concentration of various structures or markers within the tissue region masked images. More specifically, the heat map of marker expression illustrates pixels according to the respective intensity values of the pixels, and thus, corresponds to a density or amount of marker expression (e.g. cells stained with a particular marker-specific dye) in each image. Different methods are known to generate a heat map from a single channel marker image. In one example, pixel values in a heat map represent the local cell density, i.e. the number of cells positive for a biomarker in an area around each pixel. In another example, pixel values in a heat map represent the average marker intensity of cells in the neighborhood of this pixel that are positive for the marker.

To generate the heap map of marker expression, the heat map module 111 applies a low pass filter to each of the tissue region masked images (step 401). After application of the low pass filter, in some embodiments, the heat map generation module 111 assigns pseudo-colors to the low pass filtered image (step 402). For example, low intensity (corresponding to a lower marker density) regions may be assigned to blue color while higher intensity (corresponding to a higher marker density) regions are assigned to yellow, orange, and red colors. The assignment of colors to the heat map is optional and assists in the visualization of those regions having higher marker densities or concentrations. The generation of heat maps of marker expression are more fully discussion in PCT/EP/2015/062015 (WO/2015/181371), entitled "An Image Processing Method and System for Analyzing A Multi-Channel Image Obtained From a Biological Tissue Sample Being Stained By Multiple Stains," the disclosure of which is hereby incorporated by reference herein in its entirety. Further examples for generating heat maps and performing image registration and ROI identification are described in PCT/EP2015/070100 entitled "SYSTEMS AND METHODS FOR GENERATING FIELDS OF VIEW" and in PCT/EP2015/062015 (WO 2015/181371) entitled "AN IMAGE PROCESSING METHOD AND SYSTEM FOR ANALYZING A MULTI-CHANNEL IMAGE OBTAINED FROM A BIOLOGICAL TISSUE SAMPLE BEING STAINED BY MULTIPLE STAINS", the disclosures of which are hereby incorporated by reference herein in their entirety.

Region of Interest Identification Module

After the generation of a heat map of marker expression corresponding to each of the plurality of single marker channel images (step 221), each heat map of marker expression is used to identify one or more candidate regions of interest corresponding to the different markers present in the tissue sample (step 222). The identified candidate regions of interest may have an arbitrary shape or a fixed shape, as described and illustrated herein.

Figure 5A:
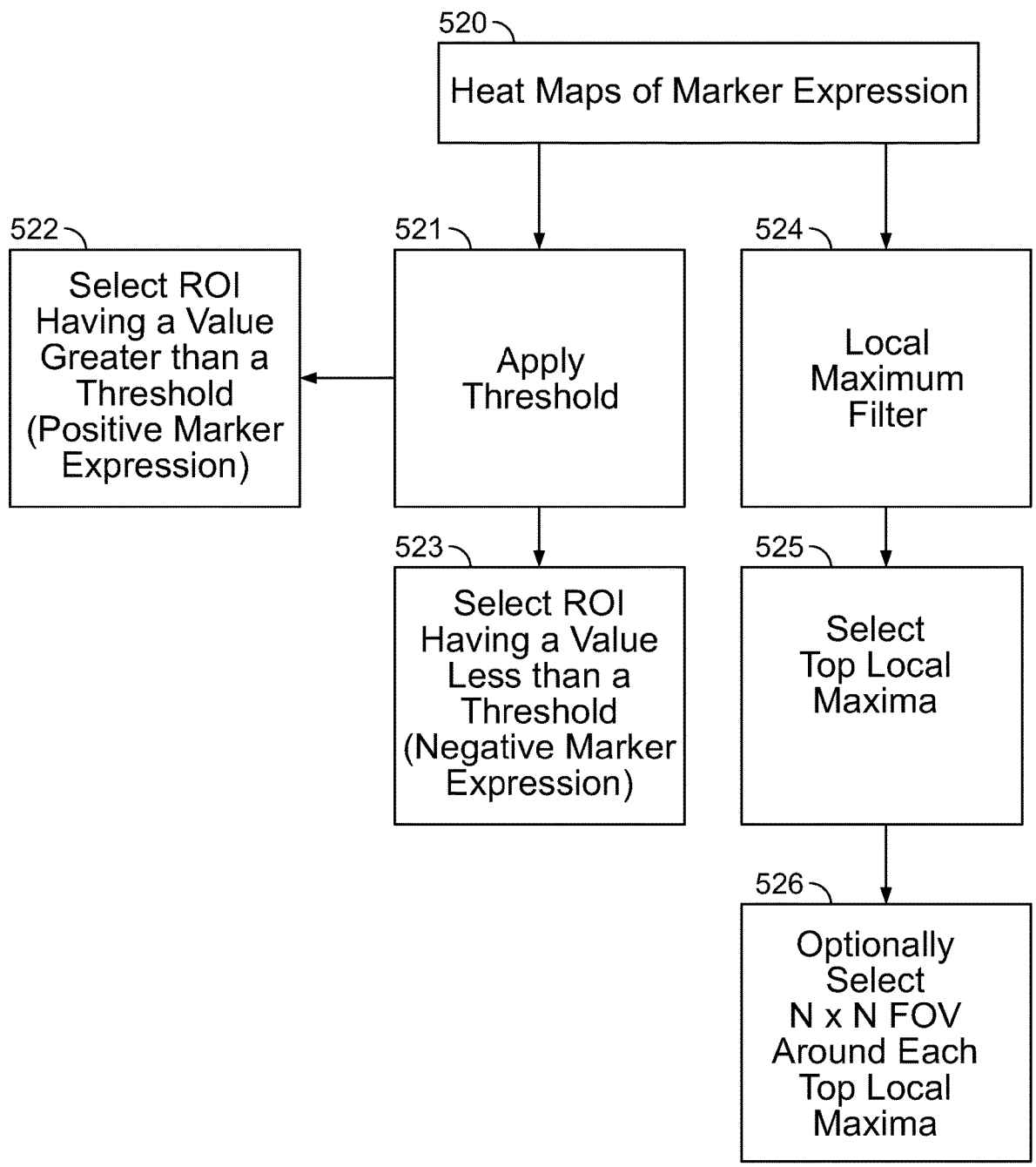
FIG. 5A provides a flowchart outlining the steps for the identification of candidate regions of interest.
Figure 5B:
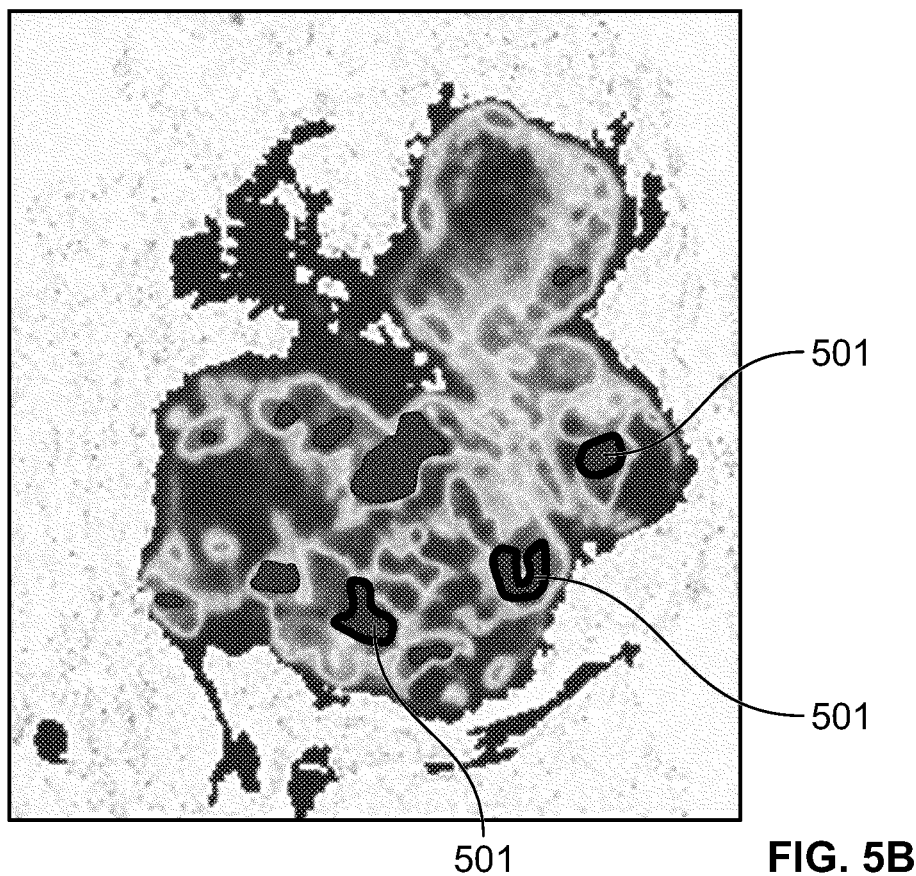
FIG. 5B illustrates a heat map of marker expression and shows candidate regions of interest.

With reference to FIG. 5A, in some embodiments, a predefined threshold is applied on the heat maps of marker expression (step 520) such that candidate regions of interest may be identified (step 521). FIG. 5B illustrates an example of a heat map of marker expression where candidate regions of interest 501, having arbitrary shapes, are identified.

Candidate ROIs corresponding to both areas of positive marker expression and, separately, negative marker expression may be identified by this technique.

An "area of positive marker expression" as used herein is, for example, an area in a digital image whose pixel intensities correlate with the density of a respective marker-specific stain and which are above a particular threshold value. Thus, an "area of positive marker expression" is a digital image area indicating that a particular biomarker (that may be indicative of the presence of a particular cell type, e.g. an immune cell type) is expressed in a particular area of a tissue sample that corresponds to said image area.

An "area of negative marker expression" as used herein is, for example, an area in a digital image whose pixel intensities correlate with the density of a respective marker-specific stain and which are below a particular threshold value. Thus, an "area of negative marker expression" is a digital image area indicating that a particular biomarker (that may be indicative of a particular cell type, e.g. an immune cell type) is not expressed or only weakly expressed in a particular area of a tissue sample that corresponds to said image area, e.g. because of the absence of a particular (immune) cell type that typically expresses said biomarker.

For example, by comparing a digital image corresponding to a particular biomarker and respective image channel with an intensity threshold, areas of positive marker expression and areas of negative marker expression within said digital image can be determined. It is also possible that first the areas of positive marker expression are determined and that then the areas of negative marker expression are identified as the inverse of said determined areas of positive marker expression.

A candidate ROI for positive marker expression indicates regions of interest identified as having high values on a heat map, i.e. representing a tissue area with a high number of cells positive for a marker, or with that marker being expressed by cells with high intensity.

A candidate ROI for negative marker expression indicates regions of interest identified as having low values on a heat map, i.e. representing a tissue area with a low number of cells positive for a marker, or with that marker not being expressed by cells, or being expressed with low intensity.

In some embodiments, the candidate regions of interest have a value greater than the applied predefined threshold and correspond to areas of positive marker expression (step 522). In some embodiments, the threshold is at least about 75% of the peak intensity value in the image. In other embodiments, the threshold is greater than 75% of the peak intensity value in the image. By positive marker expression, it is meant that thresholded regions are positive to overexpression of the marker, i.e., the biomarker is expressed to a sufficient degree as to induce, when stained with a marker specific stain, a sufficiently high pixel intensity value. In other embodiments, the candidate regions of interest have a value less than the applied predefined threshold and correspond to areas of negative marker expression (step 523). By negative marker expression, it is meant that thresholded regions are negative to overexpression of the marker, i.e., the biomarker is not expressed or only weakly expressed in corresponding sections of the tissue slide. In some embodiments, the threshold is no more than about 25% of the peak intensity value in the image. In other embodiments, the threshold is less than 25% of the peak intensity value in the image.

In other embodiments, a local maximum filter is applied to heat maps to provide local maximum filtered images (step 524).

A local maximum filter is a function to identify a region of adjacent pixels with the external boundary pixels all having a lower intensity value than a particular intensity value. In general, a local maximum filter is a type of morphological nonlinear filter which produces an image by making each pixel of the result hold the value of the maximum pixel value from the source image that lies beneath the kernel of the max filter. The kernel is a geometric mask of arbitrary shape and size, but would be constructed for this purpose to have dimensions on the order of the interesting features. A kernel can be disk-shaped, having the average size of a tumor gland or other characteristic group of tumor cells for which a local immune response can be determined.

Applying a local maximum filter may comprise overlaying an image by a kernel image of said filter, using geometric information of the kernel for identifying the maximum pixel intensity within the image region covered by the kernel overlay, and using said maximum pixel intensity as the pixel intensity of all pixels in said image region in the image output as the result of the local maximum filter. For example, the kernel may be a frame having square shape and having the size of 3×3 pixels that may "slide" over a marker-specific image. Thereby, for each position, the minimum and maximum intensity value of the underlying 9 image pixels are identified. If the intensity of all pixels of said sliding "frame" or kernel are higher than a (filter specific) threshold intensity value, each of said 9 pixels is assigned the maximum intensity value observed for any one of the 9 pixels.

The output image from a local maximum filter will tend to have islands shaped like the kernel and with constant values equal to the maximum pixel value (i.e., the pixel having the highest intensity value) in that region. Additional information and examples relating to the application of local maximum filters to identify fields of view are disclosed in PCT/EP/2015/062015 (WO/2015/181371), entitled "An Image Processing Method and System for Analyzing A Multi-Channel Image Obtained From A Biological Tissue Sample Being Stained By Multiple Stains," the disclosure of which is hereby incorporated by reference herein in its entirety.

In some embodiments, the local maximum values, derived by local maximum filtering, are sorted and a predetermined number ("K") of the highest ranked local maxima are selected for each local maximum filtered image (step 525). In some embodiments, the predetermined number of local maxima returned range from about 5 to about 25 local maxima per marker specific image channel or respective hat map. In other embodiments, the predetermined number of local maxima returned range from about 5 to about 15 local maxima. In yet other embodiments, the predetermined number of local maxima returned ranges from about 5 to about 10.

Figure 6:
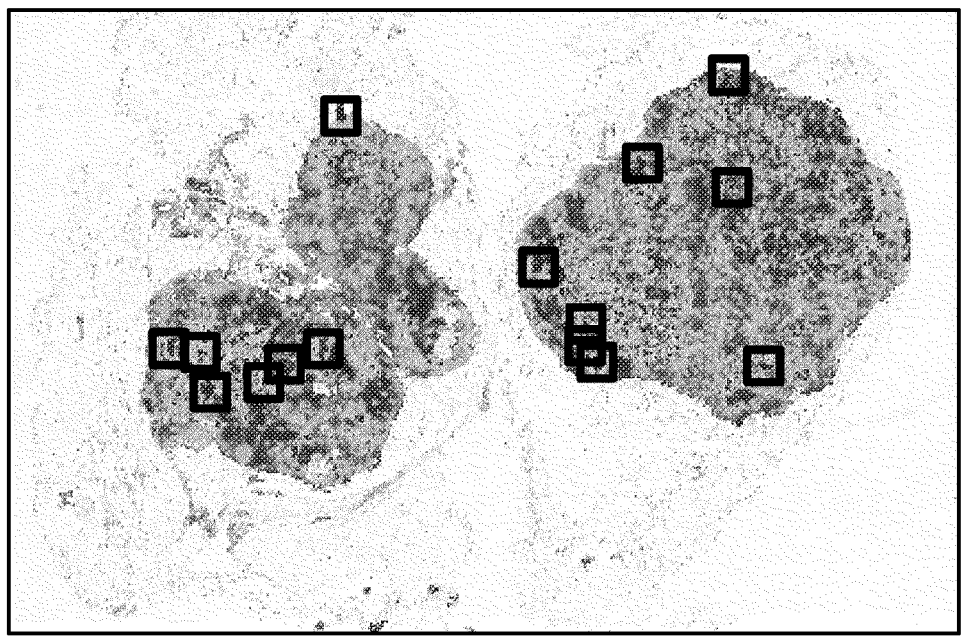
FIG. 6 illustrates a heat map of marker expression and shows candidate regions of interest as N×N pixel areas, where the N×N pixel areas comprise computed local maxima.

In some embodiments, an area surrounding a local maxima is identified and used as the region of interest (step 526). In some embodiments, an area having a pixel size of N×N pixels is delineated around each of the predetermined number of highest ranked local maxima and these N×N pixel areas (fields of view (FOVs)) are selected as the candidate regions of interest. In some embodiments, N may range from about 5 pixels to about 25 pixels. In some embodiments, the N×N pixel area is $15^2$. In other embodiments, the N×N pixel area is 182. In yet other embodiments, the N×N pixel area is $20^2$. Candidate FOVs from a heat map of marker expression, each having an N×N area, are illustrated in FIG. 6. In some embodiments, the N×N FOV is placed around the center of the identified local maximum. It should be noted that in the context of FIG. 5a and in the context of FOVs, the parameter "N" represents the numbers of pixels along one dimension of the FOV of embodiments of the invention while the parameter "N" in the context e.g. of FIG. 2A "N" represents the number of markers applied to a tissue sample. Of course, the number of markers on the one hand and the numbers of pixel along a FIV dimension do not depend on each other and may differ from each other.

Figure 9A:
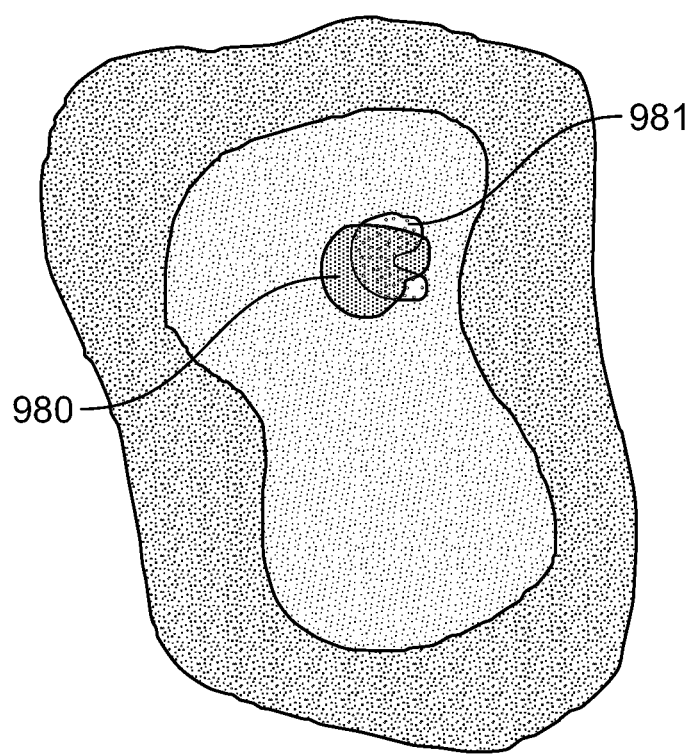
FIG. 9A illustrates two superimposed overlay masks, each overlay mask showing one candidate region of interest, each overlay mask corresponding to one marker.
Figure 9B:
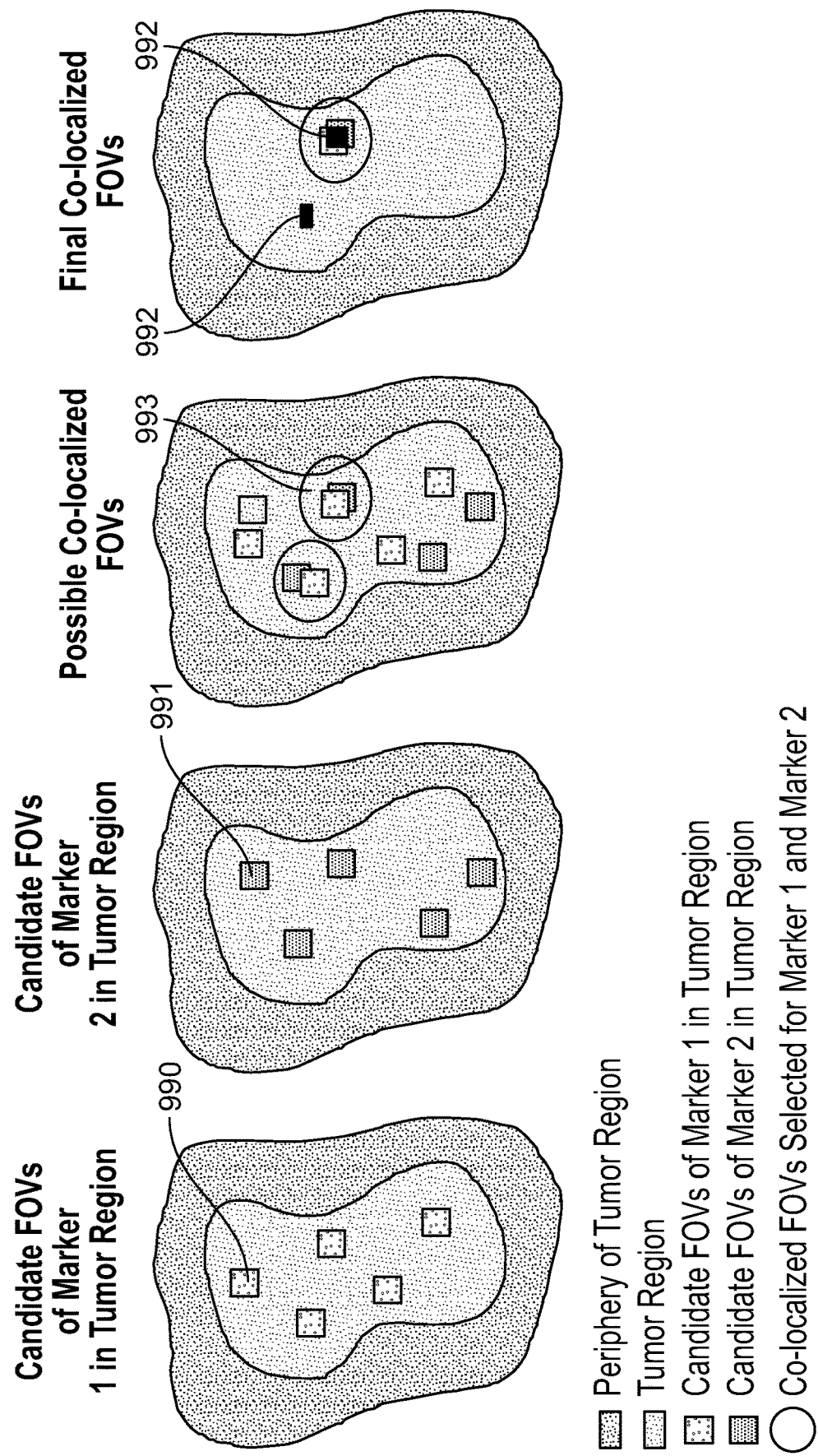
FIG. 9B illustrates overlays masks for first and second markers, the superimposition of those overlay masks to show overlapping candidate regions of interest from different markers, and possible co-localized regions of interest.
Figure 9C:
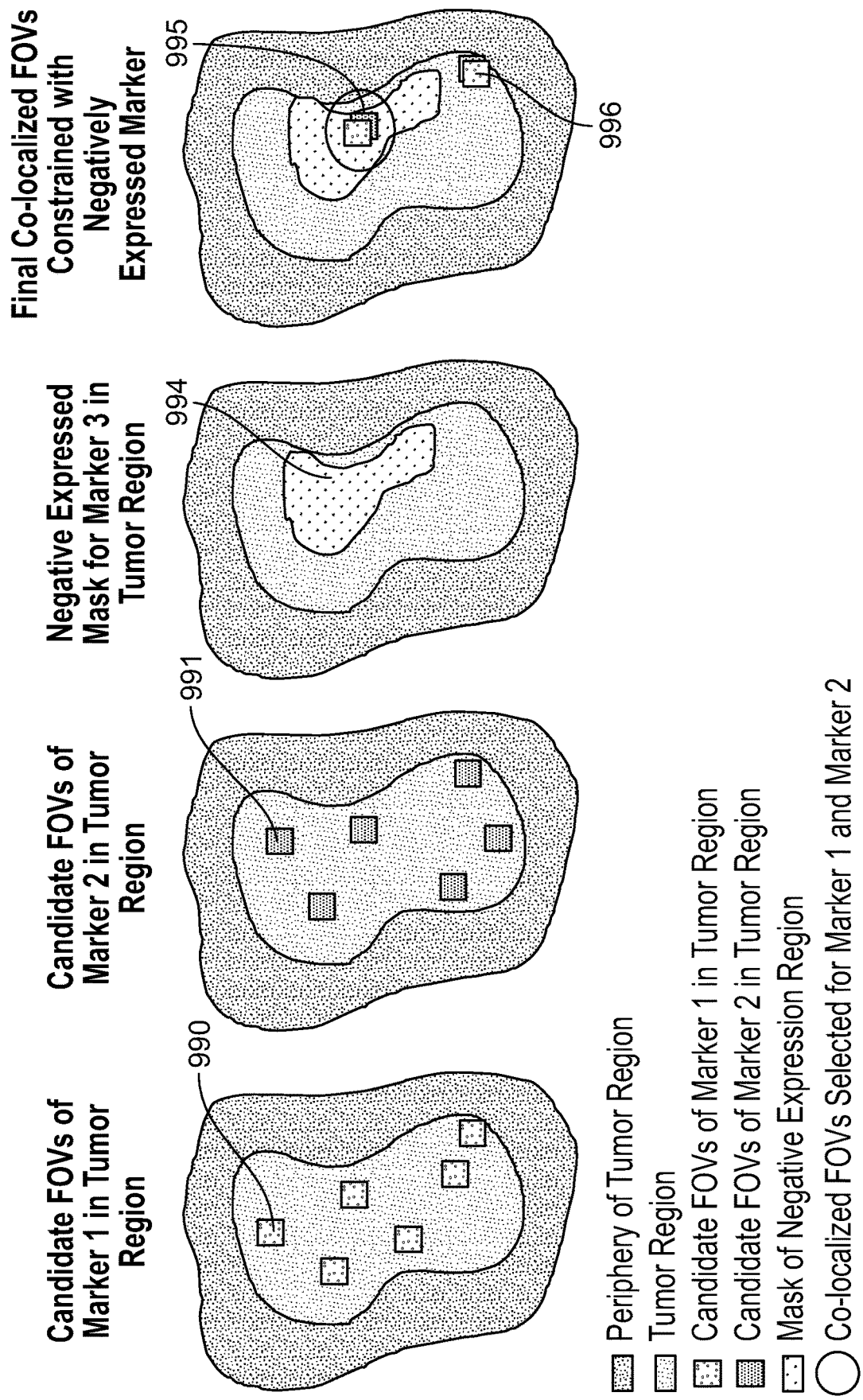
FIG. 9C illustrates overlays masks for first and second markers, a region of interest for a negatively expressed marker, the superimposition of those overlay masks to show overlapping candidate regions of interest from different markers including the negatively expression marker, and possible co-localized regions of interest.

Following identification of the candidate ROIs (step 222), overlay masks are generated (step 223), where each overlay mask comprises the identified one or more candidate ROIs from each heat map of marker expression. For example, the first and second images in FIGS. 9B and 9C illustrate masks for first candidate fields of view 990 pertaining to a first marker and second candidate fields of view 991 pertaining to a second marker. Each mask, as illustrated, shows only the fields of view (or regions of interest) pertaining to one marker. In some embodiments, the overlay masks are generated by assigning a value of 1 to image pixels above a threshold, and values of 0 to pixels below the threshold. In some embodiments, each mask is assigned a different color or shading such that when the different masks are superimposed over each other, potential co-localized regions of interest may be visualized or otherwise identified.

After overlay masks are created for each heat map of marker expression, the overlay masks may be superimposed over one another. For example, FIG. 9A illustrates the superimposition of two masks, each mask providing a candidate region of interest for each of two single markers. As will be appreciated by the skilled artisan, the superimposition of the various masks allows for the visualization of overlapping candidate ROIs and eventual computation of one or more co-localized ROIs, as described herein. The third images of both FIGS. 9BA and 9C also illustrate the superimposition of two masks, each mask providing candidate FOVs 990, 991 for a specific marker, where the overlap between candidate FOVs 992 from different markers is illustrated. In some embodiments, the overlay masks are superimposed after the candidate ROIs from each heat map of marker expression or overlay mask are aligned to a common coordinate system as described herein.

The generated overlay masks are used in the identification of the co-localized ROIs. In some embodiments, all of the candidate ROIs pertaining to all of the markers are selected for identification of co-localized ROIs, and thus all of the overlay masks are utilized (superimposed). In other embodiments, only candidate ROIs corresponding to certain markers are selected for identification of one or more co-localized ROIs, and thus only those overlay masks corresponding to the selected markers are utilized (superimposed). By way of example, if three single marker channel images are received as input, corresponding to three different immunohistochemical (IHC) markers, and co-expression analysis is sought for only two of those IHC markers, then the colocalization module will only process those overlay masks corresponding to those two selected IHC markers.

Intermarker Registration Module

In some embodiments, and following identification of the selected one or more candidate ROIs, an intermarker registration module is utilized to register each of the identified candidate regions of interest to a common coordinate system (step 224). Intermarker registration is required only where the identified candidate ROIs are derived from images of serial tissue sections, i.e. a series of simplex images or where a combination of multiplex and simplex images are used. The skilled artisan will recognize that the plurality of single marker channel images derived from a multiplex image do not need to be registered since the cells and structures in each unmixed image are in identical positions in each image.

Intermarker registration is the process of transforming different sets of data, here images, or markers within images, into one common coordinate system. More specifically, intermarker registration is the process of aligning two or more images and, in general, involves designating one image as the reference (also called the reference image or the fixed image), and applying geometric transformations to the other images so that they align with the reference. A geometric transformation maps locations in one image to new locations in another image. The step of determining the correct geometric transformation parameters is key to the image registration process. The methods for computing a transformation of each image to a reference image are well known to those skilled in the art. For example, an image registration algorithm is described, for example, in "11th International Symposium on Biomedical Imaging (ISBI), 2014 IEEE, Apr. 29 2014-May 2, 2014), the disclosure of which is hereby incorporated by reference herein in its entirety. A detailed method of image registration is outlined below.

In some embodiments, the intermarker registration process (step 224) comprises selecting one heat map or heat map mask comprising one or more candidate ROIs to serve as a reference image, and computing a transformation of each other heat map or heat map mask comprising the other candidate ROIs to the coordinate system of the reference image. All the images may be aligned to the same coordinate system (e.g. the reference coordinate can be the slide section in the middle of the tissue block in the case of serial tissue sections or the slide with a specific marker) using image registration. Each image may therefore be aligned from its old coordinate system to the new reference coordinate system. The transformation parameters to align heat maps can be determined by registering heat map images, the single channel marker images that were used to generate heat map images, or the captured tissue images that were used to generate single channel marker images. All of these images are referred to as digital input images when describing their registration.

Intermarker registration processes are well known in the art and any of the known methods may be applied to the present disclosure. In some embodiments, the intermarker or image registration is performed using the methods described in WO/2015/049233, entitled "Line-Based Image Registration and Cross-Image Annotation Devices, Systems and Methods," filed on Sep. 30, 2014, the disclosure of which is hereby incorporated by reference herein in its entirety. WO/2015/049233 describes a registration process comprising a coarse registration process used alone or in combination with a fine registration process. In some embodiments, the coarse registration process may involve selecting digital images for alignment, generating a foreground image mask from each of the selected digital images, and matching tissue structure between the resultant foreground images.

In further embodiments, generating a foreground image mask involves generating a foreground image from the whole slide image of a stained tissue section and applying OTSU thresholding to the foreground image to produce a binary image mask. The foreground image may be a grayscale image. In some embodiments, the foreground image and the binary image mask created therefrom are soft-weighted, i.e., a gray scale image with continuous intensity values. In other further embodiments, generating a foreground image mask involves generating a binary (optionally soft-weighted) image mask from a whole slide image of a stained tissue section, separately generating a gradient magnitude image mask from the same whole slide image, applying OTSU thresholding to the gradient image mask to produce a binary gradient magnitude image mask, and combining the binary (soft-weighted) image and the binary gradient magnitude image mask using a binary OR operation to generate the foreground image mask. Other methods of foreground image mask generation known in the art may be applied alternatively.

A "gradient magnitude image mask" as used herein is, for example, an image mask that hides ("masks") all pixels which have assigned an intensity gradient whose size exceeds a given threshold value and/or whose direction is not within a given range of allowed directions. Thus, applying a gradient magnitude image mask will return an image which may selectively comprise pixels lying on sample structures having a strong intensity contrasts, e.g. membranes and other.

A "foreground image mask" as used herein is, for example, an image mask that hides ("masks") all pixels which do not belong to the tissue sample. Thus, applying a foreground image mask will return a "foreground image" which does not comprise the (typically noisy) intensity information of non-tissue sample areas.

According to embodiments, the computation of the foreground image and/or of the foreground image mask is performed as described in WO2014140070, which is hereby include in its entirety by reference.

In some embodiments, matching tissue structure involves computing line-based features from the boundary of each of the resultant foreground image masks. These line-based features are computed to describe the local segments of the tissue outline by their position, curvature, direction, and other properties. It further includes computing global transformation parameters (e.g. rotation, scale, shift) between a first set of line-features on a first foreground image mask and a second set of line-features on a second foreground image mask, and globally aligning the first and second image based on the transformation parameters. Global transformation parameters may include a rotation, a translation, and a scaling that, when applied to the first image result in an overlap of the tissue in this first image with the tissue in the second image.

According to embodiments, the line-based features are edge-related features, e.g. edge maps. The computation of the edge maps and the global transformation parameters are described, for example, in WO2014140070, included in its entirety by reference.

In yet further embodiments, a coarse registration process includes mapping the selected digital images based on the global transformation parameters to a common coordinate system, which may encompass the selected digital images. In some embodiments, a fine registration process may involve identifying a first sub-region of a first digital image in the set of digital images having been aligned already in a coarse registration process; identifying a second sub-region on a second digital image in the set of aligned digital images, wherein the second sub-region is larger than the first sub-region and the first sub-region is located substantially within the second sub-region on common coordinate system (also referred to as "grid"); and, computing an optimized location for the first sub-region in the second sub-region.

Figure 7:
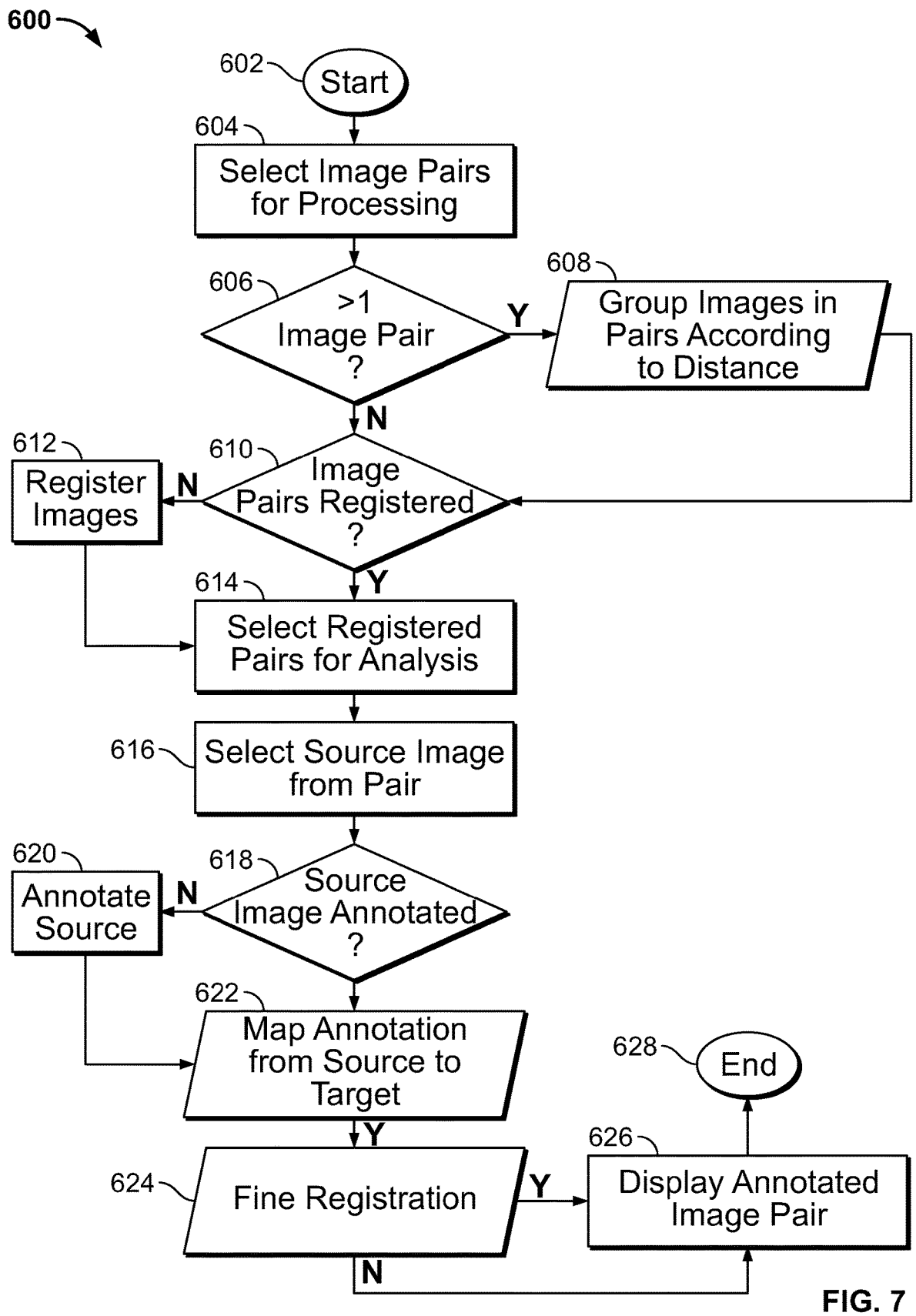
FIG. 7 provides a flowchart outlining the steps for one method of image registration.

These methods are illustrated in FIG. 7 herein, where the method 600 begins at the start block 602. At block 604, a set of image data or digital images is acquired (e.g. scanned or selected from the database) for manipulation. Each set of image data includes image data corresponding to, for example, a tissue section from a set of adjacent tissue sections of a single patient. At block 606, if only a single image pair is selected, the process proceeds directly to block 610. If more than a single pair of images is selected, then the set of selected images is grouped into pairs at block 608 prior to proceeding to block 610. In some embodiments, image pairs are selected as adjacent pairs. Thus, for example, if the set of selected images includes 10 parallel, adjacent slices (LI . . . LI 0), then LI and L2 are grouped as a pair, L3 and L4 are grouped as a pair, etc. On the other hand, if information is not available as to which pairs of images are most similar to each other then, in some embodiments, images are grouped according to the similarities of the foreground image masks and gradient magnitude image masks of these images, pairing together images which are closest to one another. In exemplary embodiments of the present invention, an inter-edge/inter-image distance is utilized to pair of images. In some embodiments, edge-based Chamfer distance may be used to compute the similarity of foreground image masks or gradient magnitude image masks. If the pairs of images have previously undergone a coarse registration process, such that the images have been coarsely aligned and the results have been saved, the process advances to block 614. Otherwise, at block 612 a coarse registration process is performed on the selected image pairs, as described in paragraphs 0107 and the succeeding paragraphs.

Two or more of the images are aligned in the coarse registration process as described, for example, in WO2014140070.

Passing to block 614, the selected, and now registered (aligned), images are displayed in a common coordinate system, with the images overlaid in a single image, displayed as separate images, or both, on a single monitor or spread across several monitors. At block 616, the client user may select one of the images from a pair of images as the source image. If the source image has already been annotated as desired, the process proceeds to block 622. Otherwise, the client user annotates the source image as desired at block 620. At block 622, which may (or may not) occur substantially simultaneously with block 620, the annotation is mapped to the other image in the pair (the target image) and graphically reproduced on the target image. In embodiments wherein annotation occurs prior to coarse registration, the annotation may be mapped from the source image to the target image at substantially the same time as the pair of images is registered (aligned). At block 624, the user may choose to whether or not to engage in a fine registration process. If the user chooses to directly display the results without performing fine registration, the process proceeds to block 626.

Otherwise, at block 624 a fine registration process as described herein e.g. in paragraph 0106, 114 is performed on the selected image pairs, for example to optimize the location of the mapped annotations and/or alignment of the images. The fine registration process is discussed in further detail below. At block 626, the annotated image pair is displayed with the results of the fine registration process (or the annotated image pair may be displayed only with the results of the coarse registration process if fine registration is not used). The method then ends at the final block 628.

Co-Localization Module

After the overlays masks comprising the one or more identified candidate ROIs from each of the heat maps of marker expression are generated (step 223), the co-localization module 113 is run to identify one or more co-localized ROIs from the overlay masks or superimposed masks (step 225). The output of the co-localization module is an identification of one or more co-localized ROIs that may be used for further downstream processing, as described herein. In some embodiments, co-localization refers to the observation of the spatial overlap between two or more different markers or labels. Co-localization, in some embodiments, may be used to demonstrate a relationship between markers or labels. Co-localization information may be used, for example, for automatically identifying the types of particular cells, in particular immune cells. Information on the type and location of immune cells within a tumorous tissue sample can be used to automatically, e.g. by a medical decision support system or by an electronic image analysis system, to compute a tumor progression prognosis or to identify a particular type or stage of a tumor.

In general, the co-localized ROIs are identified by finding those identified one or more candidate ROIs corresponding to different markers that at least partially overlap with each other. Once those one or more at least partially overlapping candidate ROIs are identified, the amount of overlap is compared to an overlap threshold to determine whether those at least partially overlapping candidate ROIs qualify as co-localized ROIs.

Figure 8:
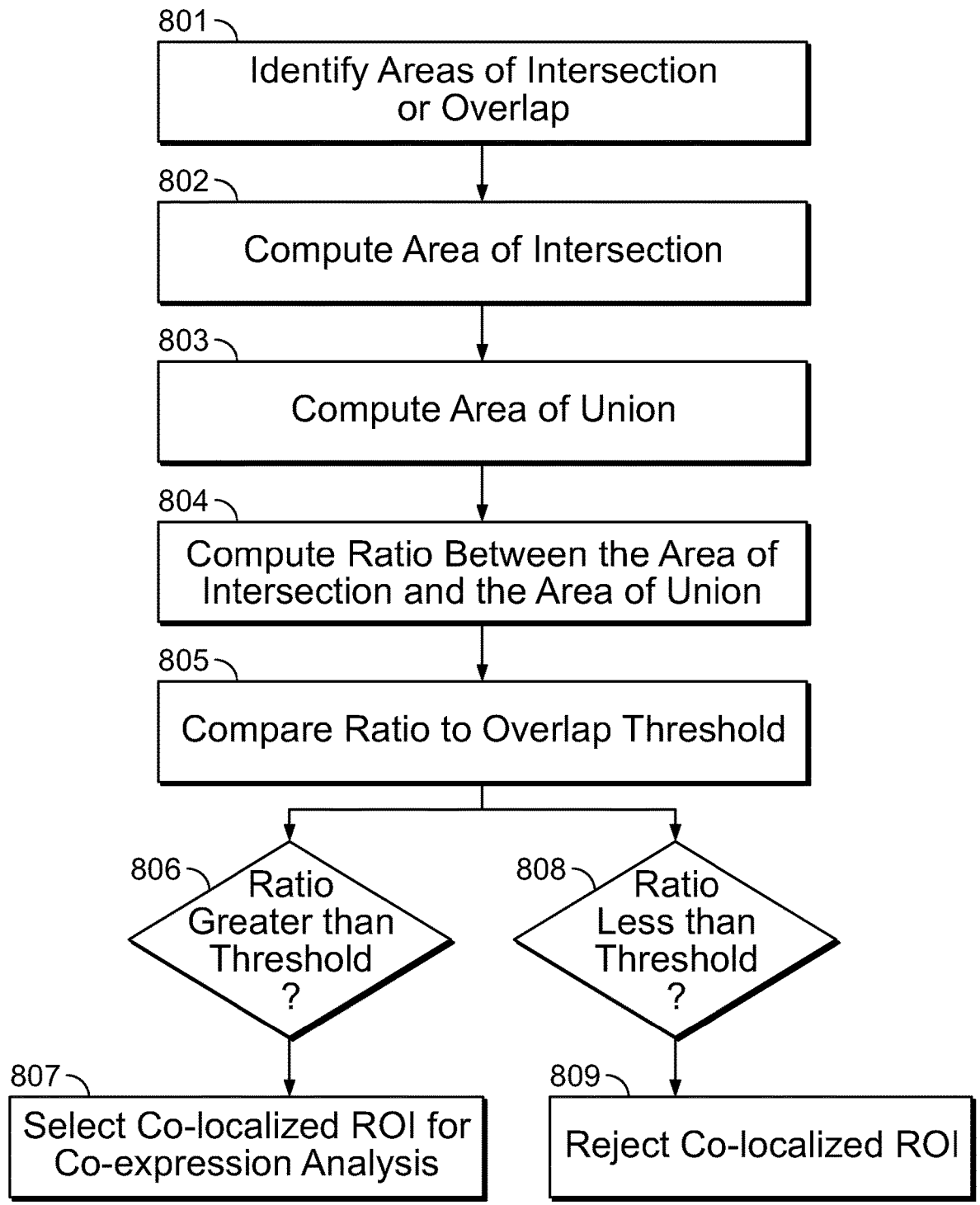
FIG. 8 provides a flowchart outlining the steps for the determination of co-localized regions of interest.

With reference to FIG. 8, the co-localization module computes one or more possible co-localized ROIs by finding those selected one or more candidate ROIs that at least partially overlap with each other (step 801). In some embodiments, those selected candidate ROIs that at least partially overlap with each other are computed by morphologically and/or logically processing the candidate ROIs from the overlay masks. In some embodiments, the morphological processing comprises computing the intersection and union of the one or more candidate ROIs. For example, the intersection area may be mapped to respective marker-specific images or heat maps and the mapped regions of said images or heat maps may be used as respective ROIs. The computing of the intersection and union utilizes combinations of standard morphological operations including opening, closing, erosion, and dilation, as known to those of ordinary skill in the art. Of course, any method may be utilized to compute an area of overlap of the selected one or more candidate ROIs. For example, when using a fixed threshold, then both, positive and negative marker ROIs could span all tissue—there could be immune cells "everywhere", or there could be none at all. For example, ROIs could be chosen as being the FOVs with the K highest or K lowest values on the heat map.

Morphological image processing is a collection of non-linear operations or techniques related to the shape or morphology of features in an image. Morphological techniques probe an image with a small shape or template called a structuring element. The structuring element is positioned at all possible locations in the image and it is compared with the corresponding neighborhood of pixels. Some operations test whether the element "fits" within the neighborhood, while others test whether it "hits" or intersects the neighborhood. When a structuring element is placed in a binary image, each of its pixels is associated with the corresponding pixel of the neighborhood under the structuring element. The structuring element is said to fit the image if, for each of its pixels set to 1, the corresponding image pixel is also 1. Similarly, a structuring element is said to hit, or intersect, an image if, at least for one of its pixels set to 1 the corresponding image pixel is also 1. The intersection of two sets A and B, denoted C=A ∩ B, is, by definition, the set of all elements that belong simultaneously to both sets A and B. Similarly, the union of two sets A and B, which is denoted C=A ∪ B, is, by definition, the set of all elements belonging to either the set A, or set B, or both sets simultaneously.

In some embodiments, an area (pixels) of the intersection (or an area of overlap) is computed for all possible pairs of ROIs that have been identified on heat maps of single-marker image channels (step 802) given the number of selected (e.g. user selected) image channels and respective image-specific ROIs. Additionally, an area (pixels) of union is computed for each possible co-localized ROI (step 803). A ratio is then computed between the area of intersection and the area of union for each possible co-localized ROI (step 804). This computed ratio is then compared to an overlap threshold (step 805) to determine whether the possible co-localized ROIs constitute co-expressed regions suitable for further analysis. An overlap threshold is, for example, a configurable and/or predefined threshold value that is to be compared with a ratio of the area of intersection of multiple candidate ROIs of different images or heat maps and the union area of said candidate ROIs. To find the overlap of ROIs from more than two heat maps, all possible combinations of one ROI per single marker image channel are tested, with the overlap being defined as ratio of the number of pixels in the intersection of all ROIs in a combination, defined by the number of pixels in their union.

The skilled artisan will appreciate that the overlap threshold may vary from assay to assay and that an appropriate overlap threshold may be selected based on the markers being detected. In some embodiments, the overlap threshold ranges from about 0.5 to about 0.8 (or about 50% to about 80% overlap). In other embodiments, the overlap threshold ranges from about 0.5 to about 0.7 (or about 50% to about 80% overlap). In other embodiments, the overlap threshold is 0.75 (or about 75% overlap). In yet other embodiments, the overlap threshold is greater than about 0.5 (or 50% overlap).

If the computed ratio is greater than an overlap threshold (step 806), then the co-localized ROI is selected for co-expression analysis (step 807). On the other hand, if the computed ratio is less than an overlap threshold (step 808), then the co-localized ROI rejected and not used for co-expression analysis (step 809).

For example, let ROI_1 (980) be one of the regions from a single marker charnel image 1 and let ROI_2 (981) be one of the regions from a single marker channel image 2, as indicated by the light shaded and darker shaded regions in FIG. 9A. The ratio INTERSECT(ROI_1, ROI_2)/UNION (ROI_1, ROI_2) is then computed. If the computed ratio is greater than the overlay threshold (e.g. about 75%), the two ROIs are considered as co-expressed regions (Marker1+, Marker2+) for marker 1 and 2.

In some embodiments, the regions of interest are areas of a predefined, fixed size. In some embodiments, the area of union (of two or more ROIs) is a fixed pixel area representing a fixed field of view. For example, if the fields of view have a size of N×N pixels, the area of union will be an area having the size N×N pixels. For example, and as shown in FIG. 9B, individual marker images 1 and 2 may be aligned and candidate fields of view (FOV) detected and overlaid. By way of example, let the size of the FOV be N×N pixels and let FOVS_1 (990) and FOVS_2 (991) represents the two FOV masks (e.g. the mask FOVS_1 indicated by lightly shaded and the mask FOVS_2 indicated by darkly shaded) from the two individual marker channel images. Overlapping regions (992) are computed using INTERSECT (FOVS_1, FOVS_2) to find the possible co-localized FOV locations as indicated by the two circles (993) in the third image of FIG. 9B. Connected component analysis, i.e., the geometric analysis of the marker-specific heat maps having been superimposed on each other, may be used to determine the number of possible co-localized regions, namely those parts of a FOV in different images which at least partially overlap each other. For each possible co-localized region, a ratio is evaluated (e.g. by INTERSECT(FOV_1, FOV_2)/ N*N) to determine the percentage of overlapping (co-localized) area compared to the whole (N×N pixel) FOV. In this example, FOV_1 and FOV_2 refer to the individual FOVs from marker channel images 1 and 2, respectively, such as the single lightly shaded box and darkly shaded box in the circle of the third image of FIG. 9B. The overlapping region (992) INTERSECT(FOV_1, FOV_2) is shown as the black box in the fourth image of FIG. 9B. If the computed ratio is greater than the overlap threshold (e.g. about 75%), the two corresponding FOVs are considered as the final co-localized FOVs to be selected (e.g. the two FOVs within the black circle of the fourth image of FIG. 9B). Once again, in this example, the final co-localized FOVs represent those areas of co-expression of the selected IHC markers.

Co-localized regions with a constraint on a negatively expressed marker (i.e. with the additional constraint that no or only a small amount of Marker3 are expressed at a particular point of the image as can be determined by comparing pixel intensities of a marker-specific heat map with a threshold value) can be found in a similar manner. ROIs can be selected for both, positive and negative marker expression. ROIs for positive marker expression are selected as having high values on a heat map (e.g. over an intensity threshold—"image area of positive marker expression"), whereas ROIs for negative marker expression are identified as having low values on a heat map (e.g. lower than an intensity threshold—"image area of negative marker expression"),). The methods to determine co-localized ROIs can be applied to ROIs of positive marker expression, ROIs of negative marker expression, or ROIs of positive marker expression with ROIs of negative marker expression.

For example, the identification of co-localized regions fulfilling the criteria that a first and a second marker are expressed at least at a minimum level and a third biomarker is expressed less than a maximum expression level may be performed as follows: a Marker1-specific channel image or heat map is analyzed for identifying one or more first ROIs whose pixel intensity values are above a first Marker1 specific threshold. Said identified one or more first ROIs are referred to as RO_1 regions. In addition, a Marker2-specific channel image or heat map is analyzed for identifying one or more second ROIs whose pixel intensity values are above a second Marker2 specific threshold. Said identified one or more second ROIs are referred to as ROI_2 regions.

In addition, a Marker3-specific channel image or heat map is analyzed for identifying one or more third ROIs whose pixel intensity values are below a third Marker3 specific threshold. Said identified one or more second ROIs are referred to as M_neg regions. Then, according to embodiments, the possible co-localized regions may be computed with the operation INTERSECT(ROI_1, ROI_2, M_neg). The size ratio of two image areas INTERSECT (ROI_1, ROI_2, M_neg)/UNION(ROI_1, ROI_2, M_neg) may then be computed. If the computed ratio is determined to be greater than a pre-defined overlay threshold (e.g. about 75%), then the co-localized ROIs, i.e., the ROIs corresponding to the intersection area, describe co-expressed regions for marker 1 and marker 2 with a constraint on the negatively expressed marker 3 (i.e., with a constraint that marker 3 is expressed not at all or not more than to a maximum amount) (Marker1+, Marker2+, Marker3−).

This is equally applicable to where the regions of interest represent fixed fields of view having an N×N pixel area as described above. As described above, an overlay ratio may be computed by INTERSECT(FOV1, FOV2, M_neg)/N*N and the overlay ratio may be compared with the overlay threshold (e.g. about 75%). If the overlay ratio is greater than the overlay threshold, the two FOVs are considered as co-expressed regions for marker 1 and 2 with a constraint on the negatively expressed marker 3, that is (Marker1+, Marker2+,Marker3−). This is illustrated in FIG. 9C, where the co-expression of Marker1+, Marker2+, Marker3− is shown in the black circle of the fourth image of FIG. 9C (995) and where the co-localized FOV outside the circle (996) shows an example of Marker1+, Marker2+, Marker3+.

In some embodiments, the overlap threshold is a predetermined value and may be specific for each co-expression analysis. For example, it is possible that for certain assays, co-expression may be tied to a higher density or higher concentration of each marker constituting the assay than others. Or, for instance, stricter overlay thresholds may be required where non-specific background staining is prevalent either due to the type of tissue being studied or the properties of the IHC markers/stains.

Transferring of the Co-Localized ROIs to the Single Marker Channel Images

After the one or more co-localized regions of interest are identified (step 225), the co-localized ROIs are mapped back to the plurality of single marker channels images (step 226). In this way, the positions of the one or more identified co-localized ROIs within each of the plurality of single marker channel images are determined and provided as output. In some embodiments, the co-localized ROIs are transferred back to high resolution versions of each of the plurality of single marker channel images. In some embodiments, the intermarker registration module described herein is utilized to map or transfer the positions of the co-localized ROIs to the single marker channel images. The output could be to a pathologist or to a cell counting module.

Cell Counting Module

Following the transferring of the positions of the co-localized ROIs to the images of marker expression (step 225), the cells expressing the individual markers may be counted or estimated (step 227). In some embodiments, an automated cell counting is performed (step 227) using a cell counting module 114. The output after cell counting is an estimate of the number of cells expressing each marker, such as in each co-localized ROI in each of the images of marker expression.

Automated cell counting methods are known in the art and any known method of cell counting may be utilized. In some embodiments, cell counting is accomplished using techniques based on image processing that captures the symmetric information of the cell appearance features. In other embodiments, machine learning techniques may be used for cell detection, such as statistical model matching learned from structured support vector machines (SVMs) to identify the cell-like regions. Features extracted from and describing image values in a region of approximately the size of a cell may be used to train the SVM.

In yet other embodiments, the counting of cells is performed using a convolutional neural network that has been trained for the task, such as described in PCT/EP/2015/061226 (WO/2015/177268), entitled "Systems and Methods for Detection of Structures and/or Patterns in Images," the disclosure of which is incorporated by reference herein in its entirety. In some embodiments, a region of interest, or an image patch taken from the region of interest, is entered into the convolutional neural network for determining a probability for the presence of a biological feature within the region of interest or the image patch derived therefrom. An image patch may be extracted from the region of interest for entry into the convolutional neural network by first identifying a location of interest within the region of interest and then extracting the image patch that contains this location of interest.

More specifically, PCT/EP/2015/061226 describes a convolutional neural network that may be trained to recognize specific cellular structures and features using training images and labels. The neural network outputs a probability that the detected structure does in fact represent a cell, membrane, background, etc. These probabilities may undergo a local maxima finding method such as non-maximum suppression in order to identify a particular pixel that will be used as the "location" of the object. A particular part of the cell, e.g., the approximate center of a nucleus, is illustratively used as the "location" of the object within the area under observation, i.e. an image patch. In some embodiments, a cell detector may comprise a learning means that is trained using ground truths for cellular structures, such as cells, portions of cells, or other cell or image features identified by a trained operator, such as a pathologist. The trained cell detector may be used to identify cellular structures, such as immune cells, in the channels of the image that correspond to multiple types of cell markers or other target structures such as a nucleus. The learning means may include generating a convolutional neural network (CNN) by analyzing a plurality of training images with ground truths labeled thereon. Subsequent to the training, a test image or image under analysis may be divided into a plurality of patches, each patch containing one or multiple channels that are classified according to a CNN, and a probability map may be generated representing a presence of the cell or other target structure within the image. Further, a non-maximum suppression operation may be performed to obtain the coordinates of the target structure from the probability map.

Any method of cell counting now known or later discovered may be used. Other cell counting methods are described by Chen et. al. "Deep Learning Based Automatic Immune Cell Detection for Immunohistochemistry Images" (G. Wu et al. (Eds.): MLMI 2014, LNCS 8679, pp. 17-24, 2014), the disclosure of which is incorporated by reference herein in its entirety. This method pertains to a novel method for automatic immune cell counting on digitally scanned images of IHC stained slides. The method first uses a sparse color unmixing technique to separate the IHC image into multiple color channels that correspond to different cell structures. The detection problem is then formulated into a deep learning framework using the image channels corresponding to the appropriate cellular structures. The algorithm is evaluated on a clinical data set containing a large number of IHC slides. In other embodiments, the method described by Diem et. al. "Image Analysis for Accurately Counting CD4+ and CD8+ T Cells in Human Tissue," Journal of Virological Methods, Vol. 222, 15 Sep. 2015, pp. 117-121, the disclosure of which is incorporated by reference herein in its entirety. In yet other embodiments, the methods disclosed by Halama et. al. "Estimation of Immune Cell Densities in Immune Cell Conglomerates: An Approach for High-Throughput Quantification," PLOS one, Nov. 16, 2009 (DOI: 10.1371/journal.pone.0007847), the disclosure of which is incorporated by reference herein in its entirety.

Typically, the cell counting module is executed on the full resolution images to ensure that the full amount of the available pictorial information can be used for performing the analysis.

EXAMPLES

Examples of IHC assays that benefit from the co-expression analysis described herein include the following:

(FoxP3+,CD3+,CD8−)

The intersection of the above-identified markers describes T-regulator or effector immune cells which are presumed T-helper or memory immune cells.

(CD3+,CD8+)

The intersection of the above-identified markers describes activated cytotoxic T-cells.

(CD3+,CD8−,PD-L1+) or (CD8+,PD-L1−)

The intersection of the above-identified markers describes T-cells in which Pd-L1 has suppressed anti-tumor CD8+ cells.

Figure 11:
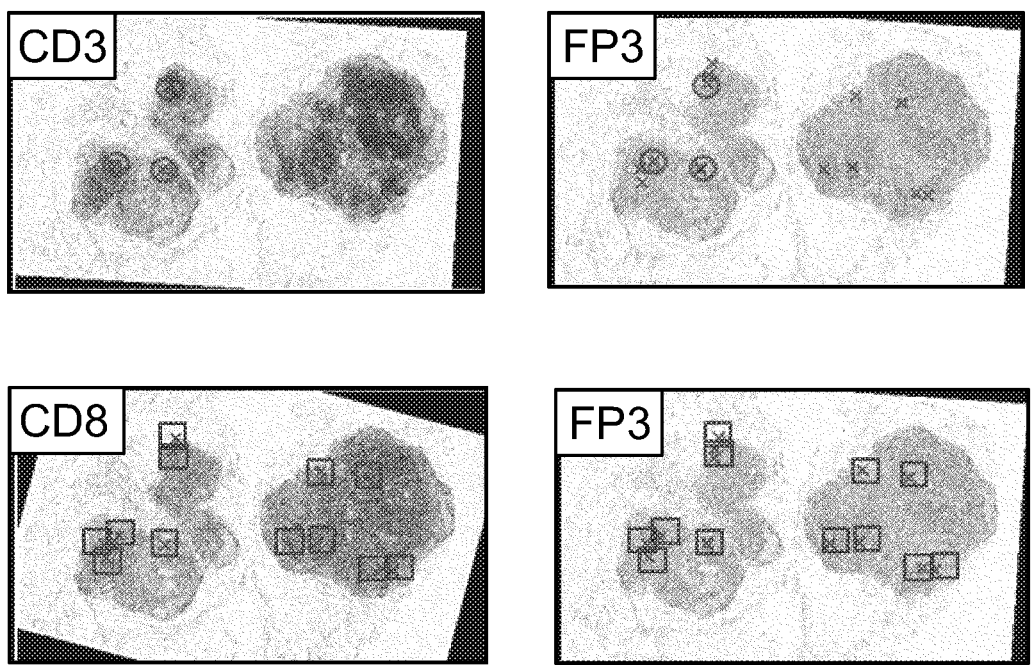
FIG. 11 illustrates several co-localized fields of view for different markers, where the circles represent "hotspots" where both CD3 and FoxP3 have high expression, and where squares represent "hotspots" where both CD8 and FoxP3 have high expressions, with CD3, CD8, and FoxP3 being examples for markers that identify and characterize immune cells.

FIG. 11 illustrates co-localization examples for (CD3+, FoxP3+) and (CD8+,FoxP3+).

Figure 10:
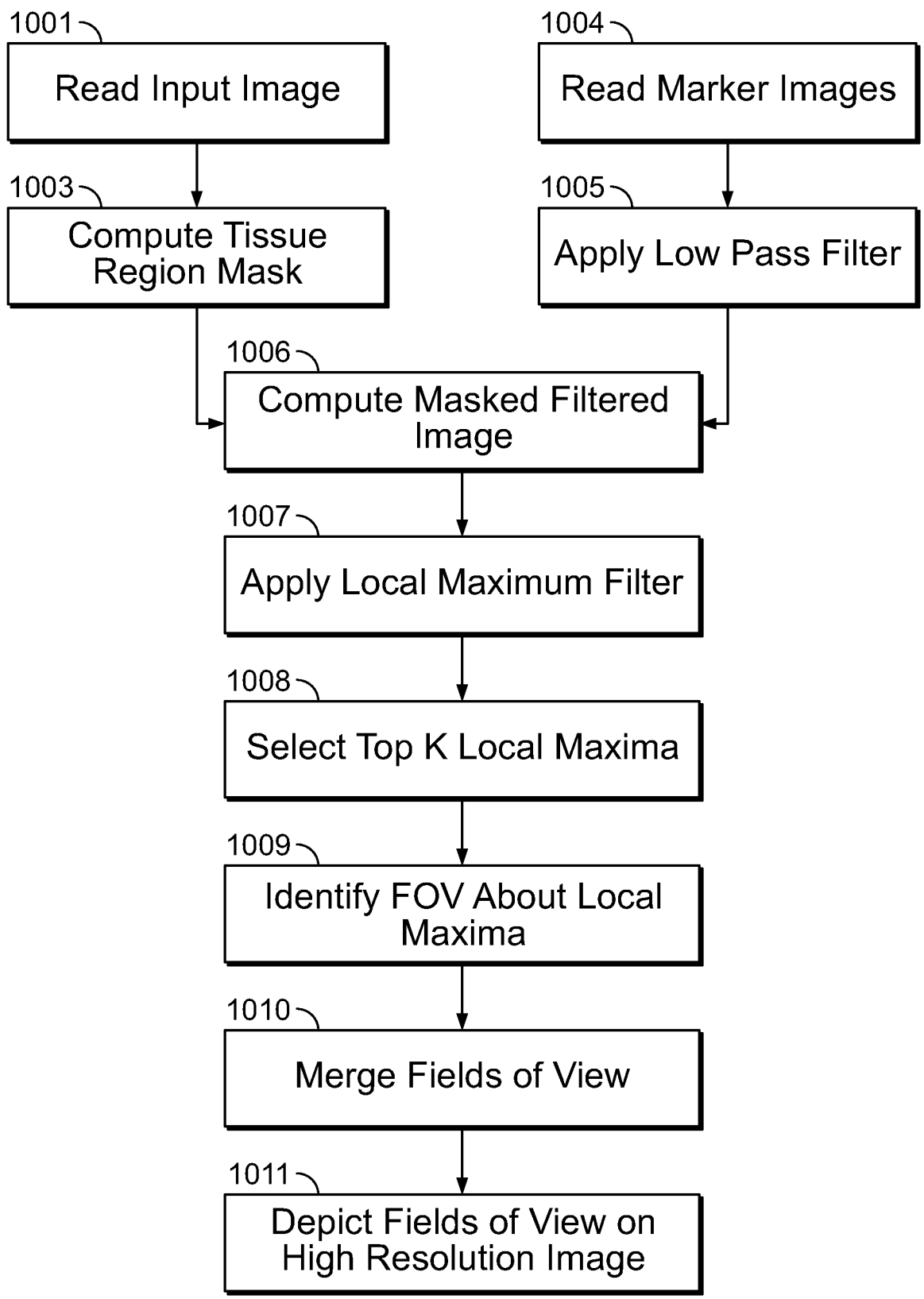
FIG. 10 provides a flowchart outlining an alternative method of determining co-localized regions of interest and transferring those determined co-localized regions of interest to a high resolution image.

FIG. 10 depicts a process flow according to another embodiment of the present disclosure. An input image (1001) is received from the image acquisition system. In addition, a series of low-resolution marker images (1004) are received from the image acquisition system. The marker images may be derived by unmixing of the high-resolution image or may be received as single stain slide images. The low resolution input image is used to compute a tissue region mask (1003), which indicates which parts of the image contain tissue of interest. The low resolution image marker images are passed through a low pass filter to produce filtered image marker images (1005). The tissue region mask is then applied to the low pass filtered images to block out (reduce to 0) regions that are not of interest. The results in a masked filtered image (1006) for each marker. A local max filter is applied to a max filtered image to identify local maxima (1007). The top K local maxima are selected (1008), and for each local maxima a field of view is defined (1009). Then the FOVs for each image are merged (1010), by transferring all images to a common coordinate system and overlaying and combining any overlapping fields of view. The merged fields of view are then transferred back to the original image coordinate system, extracting the regions from the high resolution input image for analysis.

Other Components for Practicing Embodiments of the Present Disclosure

The computer system of the present invention may be tied to a specimen processing apparatus that can perform one or more preparation processes on the tissue specimen. The preparation process can include, without limitation, deparaffinizing a specimen, conditioning a specimen (e.g., cell conditioning to enable and facilitate antigen retrieval), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as can be obtained from sections of cell pellet preparations. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, chromogens, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 (WO/2011/049608) and U.S. Patent Application No. 61/533,114 are incorporated by reference in their entities. In other embodiments, the imaging apparatus includes a digital camera coupled to a microscope.

The imaging system or apparatus may be a brightfield microscopy system, a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by a color camera, for example an RGB camera, by optical filters or by the use of other instruments capable of selecting a pre-determined spectral component including electromagnetic radiation at wavelengths beyond the range of visible light range, such as, for example, infrared (IR).

An MSI may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although the invention herein has been described with reference to particular embodiments, it is to be understood that these embodiments are merely illustrative of the principles and applications of the present invention. It is therefore understood that numerous modifications may be made to the illustrative embodiments and that other arrangements may be devised without departing from the spirit and scope of the present invention as defined by the appended claims. The foregoing written specification is considered to be sufficient to enable one skilled in the art to practice the invention.

The invention claimed is:

1. A digital image analysis method for co-expression analysis of multiple markers in a tissue sample comprising:
   accessing a plurality of single marker channel images, each of the plurality of single marker channel images being a digital image whose pixel intensity values correlate with the amount of a respective single marker in the tissue sample, wherein the plurality of single marker channel images comprise images derived from a series of serial tissue sections;

computing a heat map of marker expression for each of the single marker channel images;
identifying one or more candidate regions of interest (ROIs) in each heat map of marker expression;
computing overlay masks comprising the identified one or more candidate ROIs from each heat map of marker expression, an overlay mask being an image mask masking out all pixels not belonging to one of the identified candidate ROIs of the heat map the overlay mask was derived from;
identifying one or more co-localized ROIs from the overlay masks by
identifying intersection areas and/or union areas of the candidate ROIS of two or more of the heat maps;
mapping the identified intersection or union areas back to the two or more heat maps; and
using the candidate ROIs or parts thereof which correspond to said mapped-back intersection or union areas as the one or more co-localized ROIs; and
selectively analyzing pixel intensities of the co-localized ROIs of two or more of the heat maps for determining if the markers corresponding to the two or more heat maps are co-expressed in the tissue sample.

2. The method of claim 1, wherein the identifying of the one or more candidate ROIs comprises applying an intensity threshold to each heat map of marker expression.

3. The method of claim 2, wherein in case the intensity values of the pixels of one or more sub-regions of any of the heat maps are below the intensity threshold, said sub-region of the heat map is identified a candidate ROI, said candidate ROI corresponding to regions in the sample in which the marker is not expressed or is expressed less than a given expression threshold.

4. The method of claim 2, wherein in case the intensity values of the pixels of one or more sub-regions of any of the heat maps are above the intensity threshold, said sub-region of the heat map is identified a candidate ROI, said candidate ROI corresponding to regions in the sample in which the marker is expressed stronger than the given expression threshold.

5. The method of claim 1, wherein the identifying of the one or more candidate ROIs comprises applying a local maximum filter to each heat map of marker expression for identifying the highest ranked local pixel intensity maxima in said heat map, selecting a predetermined number of sub-regions of the heat map surrounding a respective one of identified local intensity maxima, and using the selected sub-regions as the candidate ROIs of said heat map.

6. The method of claim 5, further comprising a step of delineating a field of view (FOV) having a set (N×N) of pixels around each of the selected predetermined number of highest ranked local intensity maxima, and using the delineated set (N×N) of pixel FOVs as the selected sub-regions to be used as the candidate ROIs of said heat map.

7. The method of claim 1, wherein the identifying of co-localized ROIs comprises:
identifying one or more at least partially overlapping candidate ROIs corresponding to different markers and respective marker-specific heat maps of marker expression;
identifying an intersection area of the identified at least partially overlapping candidate ROIs;
identifying a union area of the identified at least partially overlapping ROIs of the different marker-specific heat maps;
computing a ratio between the identified intersection area and the identified union area;
evaluating whether the computed ratio exceeds an overlap threshold.

8. The method of claim 1, wherein the computing of the heat maps of marker expression comprises applying a low pass filter to each of the plurality of single marker channel images.

9. The method of claim 1, wherein the plurality of single marker channel images further comprise single marker channel images derived by unmixing a multi-channel image of a tissue sample into single marker channel images.

10. The method of claim 1, wherein the method further comprises the step of registering each of the identified candidate ROIs to a common coordinate system.

11. The method of claim 1, further comprising preprocessing the plurality of single marker channel images such that non-tissue regions are masked.

12. The method of claim 1,
wherein less than all of the plurality of single marker channel images are used to identify co-localized ROIs; and/or
wherein a GUI enables a user to select the single marker channel images to be used for identifying co-localized ROIs.

13. The method of claim 1, further comprising counting cells within at least one identified co-localized region of interest in at least some of the plurality of single marker channel images; and optionally using the cell counts of co-localized regions of two or more different marker channel images for computing an immune score.

14. A computer system for co-expression analysis of multiple markers in a tissue sample comprising one or more processors communicatively coupled to at least one memory, the at least one memory storing non-transitory computer-readable instructions for execution by the one or more processors to cause the one or more processors to:
compute a heat map of marker expression for each of a plurality of single marker channel images, wherein each of the plurality of single marker channel images comprise a single marker;
identify one or more candidate regions of interest (ROIs) in each heat map of marker expression;
compute overlay masks comprising the identified one or more candidate ROIs from each heat map of marker expression;
determine one or more co-localized ROIs from the overlay masks; and
transfer the identified one or more co-localized ROIs to each of the plurality of single marker channel images,
wherein the plurality of single marker channel images comprise images derived from a series of serial tissue sections.

15. The computer system of claim 14, wherein the one or more candidate ROIs are identified by applying a threshold to each heat map of marker expression.

16. The computer system of claim 15, wherein the identified one or more candidate ROIs have a value less than the applied threshold and correspond to regions of negative marker expression.

17. The computer system of claim 15, wherein the identified one or more candidate ROIs have a value greater than the applied threshold and correspond to regions of positive marker expression.

18. The computer system of claim 14, wherein the one or more candidate ROIs are identified by applying a local maximum filter to each heat map and selecting a predetermined number of highest ranked local maxima.

19. The computer system of claim 18, wherein a field of view (FOV) having N×N pixels is delineated around each of the selected predetermined number of highest ranked local maxima and wherein the N×N pixel FOVs are selected as the identified one or more candidate ROIs.

20. The computer system of claim 19, wherein the co-localized ROIs are determined by identifying one or more at least partially overlapping candidate ROIs that correspond to different markers.

21. The computer system of claim 20, wherein the one or more at least partially overlapping candidate ROIs are determined by morphologically and/or logically processing the overlay mask.

22. The computer system of claim 20, wherein the system executes instructions to evaluate whether an area of intersection of each of the one or more at least partially overlapping candidate ROIs meets an overlap threshold.

23. The computer system of claim 22, wherein the evaluation of whether the area of intersection meets the overlap threshold comprises computing a ratio between the area of intersection and an area of union of the at least partially overlapping candidate ROIs and comparing the computed ratio to the overlap threshold.

24. The computer system of claim 14, wherein the heat maps are computed by applying a low pass filter to each of the plurality of single marker channel images.

25. The computer system of claim 14, wherein the plurality of single marker channel images further comprise single marker channel images derived by unmixing a multi-channel image of a tissue sample.

26. The computer system of claim 14, wherein each of the identified candidate ROIs are registered to a common coordinate system.

27. The computer system of claim 14, wherein the plurality of single marker channel images are preprocessed such that non-tissue regions are masked.

28. The computer system of claim 14, wherein the identified co-localized ROIs correspond to less than all of the markers.

29. The computer system of claim 14, wherein the computer system further executes instructions to count cells in at least one identified co-localized region of interest in at least some of the plurality of single marker channel images.

30. A computer-implemented method for co-expression analysis of multiple markers in a tissue sample comprising:

computing a heat map of marker expression for each of a plurality of single marker channel images, wherein each of the plurality of single marker channel images comprise a single marker;
identifying one or more candidate regions of interest (ROIs) in each heat map of marker expression;
computing overlay masks comprising the identified one or more candidate ROIs from each heat map of marker expression;
determining one or more co-localized ROIs from the overlay masks;
mapping the one or more co-localized ROIs to a same coordinate position in each of the plurality of single marker channel images; and
estimating a number of cells in at least one of the determined one or more co-localized ROIs in at least some of the plurality of single marker channel images.

31. The computer-implemented method of claim 30, wherein the identifying of one or more candidate ROIs comprises applying a threshold to each heat map of marker expression.

32. The computer-implemented method of claim 31, wherein the identified one or more candidate ROIs have a value less than the applied threshold and correspond to regions of negative marker expression.

33. The computer-implemented method of claim 31, wherein the identifying of one or more candidate ROIs comprises applying a local maximum filter to each heat map of marker expression and selecting a predetermined number of highest ranked local maxima.

34. The computer-implemented method of claim 31, wherein the determining of one or more co-localized ROIs comprises morphologically and/or logically processing the identified one or more candidate ROIs in the overlay masks.

35. The computer-implemented method of claim 34, wherein the morphological processing step identifies candidate ROIs corresponding to two or more different markers that at least partially overlap with each other.

36. The computer-implemented method of claim 35, further comprising the step of evaluating whether an area of intersection of the at least partially overlapping candidate ROIs meets an overlap threshold.

37. The computer-implemented method of claim 31, wherein each of the plurality of single marker channel images are derived from a series of serial tissue sections, where each serial tissue section is stained with a single marker.

* * * * *